United States Patent
Rangarajan et al.

(10) Patent No.: US 11,604,505 B2
(45) Date of Patent: Mar. 14, 2023

(54) PROCESSOR SECURITY MODE BASED MEMORY OPERATION MANAGEMENT

(71) Applicant: QUALCOMM incorporated, San Diego, CA (US)

(72) Inventors: Bharat Kumar Rangarajan, Bangalore (IN); Rajesh Arimilli, Bangalore (IN); Rengarajan Ragavan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 17/136,175

(22) Filed: Dec. 29, 2020

(65) Prior Publication Data

US 2022/0206559 A1 Jun. 30, 2022

(51) Int. Cl.
*G06F 1/3237* (2019.01)
*G06F 21/74* (2013.01)
*G06F 3/06* (2006.01)
*G06F 15/78* (2006.01)

(52) U.S. Cl.
CPC .......... *G06F 1/3237* (2013.01); *G06F 3/0622* (2013.01); *G06F 3/0625* (2013.01); *G06F 3/0655* (2013.01); *G06F 3/0673* (2013.01); *G06F 21/74* (2013.01); *G06F 15/7807* (2013.01)

(58) Field of Classification Search
CPC .... G06F 3/0622; G06F 3/0625; G06F 3/0655; G06F 3/0673; G06F 1/3237; G06F 21/74; G06F 15/7807
See application file for complete search history.

(56) References Cited

U.S. PATENT DOCUMENTS

| | | | |
|---|---|---|---|
| 2004/0153672 A1* | 8/2004 | Watt | G06F 9/30123 726/22 |
| 2009/0172329 A1* | 7/2009 | Paver | G06F 21/72 711/E12.091 |
| 2017/0185781 A1* | 6/2017 | Kim | G06F 8/65 |
| 2017/0213053 A1* | 7/2017 | Areno | G06F 21/76 |
| 2019/0050570 A1* | 2/2019 | Kannan | G06F 21/85 |
| 2019/0087185 A1* | 3/2019 | Kim | G06F 9/30043 |
| 2021/0157388 A1* | 5/2021 | Kulandaivel | H04L 12/40032 |
| 2021/0232337 A1* | 7/2021 | Talvitie | G06F 21/74 |

* cited by examiner

*Primary Examiner* — Raymond N Phan
(74) *Attorney, Agent, or Firm* — The Marbury Law Group/Qualcomm

(57) ABSTRACT

Various embodiments include methods and devices for system on chip infrastructure of system on chip infrastructure secure memory access and power management. Some embodiments, include determining whether a processor is performing a secure memory access transaction, and gating a clock signal from being transmitted to a secure portion of a memory in response to determining that the processor is not performing a secure memory access transaction. Some embodiments include determining whether any processor is operating in a secure mode, and transmitting a retention signal to the secure portion of the memory in response to determining that no processor is operating in a secure mode. The retention signal may be configured to set a retention state for the secure portion of the memory.

24 Claims, 11 Drawing Sheets

PROCESSOR SECURITY MODE BASED MEMORY OPERATION MANAGEMENT

BACKGROUND

Processors, such as general purpose central processing units (CPUs), support different security modes, such as a secure mode and a non-secure mode. A system memory map, such as in a random access memory (RAM), can be divided into secure portions and non-secure portions. In a secure mode, a processor can access a complete system memory map, including both secure portions and non-secure portions of the system memory map. In a non-secure mode, the processor can only access non-secure portions of the system memory map. Similarly, processors can issue secure and non-secure memory access transactions for accessing the system memory map. Secure memory access transactions can access the complete system memory map, including both secure portions and non-secure portions of the system memory map. Non-secure memory access transactions can only access the non-secure portions of the system memory map. Secure and non-secure portions of the system memory map are powered to remain accessible to the processor regardless of the security mode in which the processor is operating and the security type of a memory access transaction.

SUMMARY

Various disclosed aspects may include apparatuses and methods for processor security mode based system on chip (SoC) infrastructure secure memory access and power management. Various aspects may include determining whether a processor is performing a secure memory access transaction, and gating a clock signal from being transmitted to a secure portion of a memory in response to determining that the processor is not performing a secure memory access transaction.

In some aspects, gating the clock signal from being transmitted to the secure portion of the memory may include continuing to gate a gated clock signal from being transmitted to the secure portion of the memory.

Some aspects may further include receiving a memory access transaction security type configured to indicate whether a memory access transaction is secure.

In some aspects, gating the clock signal from being transmitted to the secure portion of the memory may include gating the clock signal from being transmitted to configuration and status registers in the secure portion of register blocks or arrays.

In some aspects, gating the clock signal from being transmitted to the secure portion of the memory may include gating the clock signal from being transmitted to static random access memory blocks in the secure portion of a static random access memory.

Some aspects may further include determining whether any processor is operating in a secure mode, and waking up the secure portion of the memory in response to determining that a processor is operating in a secure mode.

Some aspects may further include receiving a processor security state signal, in which the processor security state signal is configured to indicate whether any processor is operating in a secure mode.

In some aspects, waking up the secure portion of the memory may include waking up static random access memory blocks in the secure portion of a static random access memory.

Various aspects may include determining whether any processor is operating in a secure mode, and transmitting a retention signal to the secure portion of the memory in response to determining that no processor is operating in a secure mode, in which the retention signal is configured to set a retention state for the secure portion of the memory.

Some aspects may further include receiving a processor security state signal, in which the processor security state signal is configured to indicate whether no processors are operating in a secure mode.

In some aspects, transmitting the retention signal to the secure portion of the memory includes transmitting the retention signal to static random access memory blocks in the secure portion of a static random access memory.

Further aspects include a computing device including a power management controller configured to perform operations or configured with processor-executable instructions to perform operations of any of the methods summarized above. Further aspects include a computing device including means for perform functions of any of the methods summarized above. Further aspects include non-transitory processor-readable medium having stored thereon processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
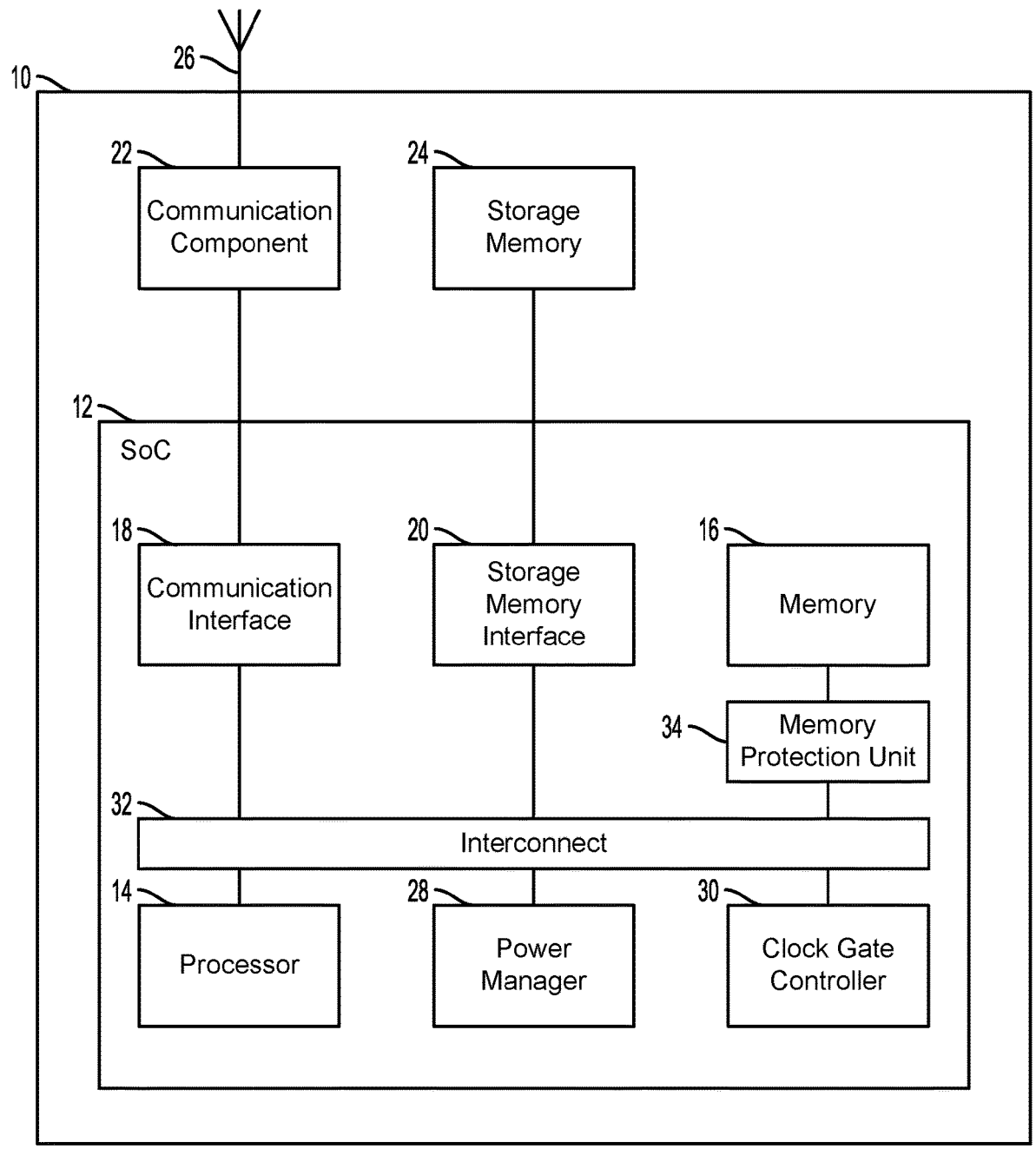
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices implementing such methods for processor security mode based system on chip (SoC) infrastructure power management. Some embodiments may include a clock gating controller configured to control clock gating for secure portions of a system memory map according to a security type of a memory access transaction. Some embodiments may include the clock gating controller gating a clock signal to a memory device having the secure portions of the system memory map in response to a memory access transaction being a non-secure memory access transaction. Some embodiments may include a memory retention controller configured to control power to retain the secure portions of the system memory map according to a security operating mode of a processor. Some embodiments may include the memory retention controller providing retention level power to the memory device having the secure portions of the system memory map in response to the processor being in a non-secure operating mode.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

A memory device, such as a random access memory (RAM), including static RAM (SRAM) and/or dynamic RAM (DRAM), a register block, a cache, a hard drive, etc., may include a system memory map. The system memory may include portions designated a secure and non-secure. A memory protection unit (MPU) and/or a memory management unit (MMU) may be configured to control access to the secure portions of the system memory map. A processor, such as a general purpose central processing unit (CPU), graphics processing unit (GPU), digital signal processor (DSP), application processing unit (APU), etc., may be configured to operate in various security modes, such as a secure mode and a non-secure mode. For the processor in the secure mode, the MPU may allow the processor to access the complete system memory map, including both secure portions and non-secure portions of the system memory map. For the processor in the non-secure mode, the MPU may allow the processor access only the non-secure portions of the system memory map, and prevent the processor from accessing the secure portions of the system memory map. In some embodiments, multiple processors may be configured with individual secure modes. For a processor in a processor specific secure mode, the MPU may allow a processor in an individual secure mode to access a processor specific portion of system memory map, including both secure portions of the system memory map allocated for the specific processor and non-secure portions of the system memory map. The MPU may also prevent the processor from accessing secure portions of the system memory map allocated for another processor.

Further, the processors in the secure mode may issue secure and non-secure memory access transactions for accessing the system memory map. The MPU may allow secure memory access transactions to access the complete system memory map, including both secure portions and non-secure portions of the system memory map. The MPU may allow non-secure memory access transactions to access only the non-secure portions of the system memory map, and prevent non-secure memory access transactions from accessing the secure portions of the system memory map.

The secure portions of the system memory map may use substantial resources, including memory space of the memory device and power. Large parts, up to entire parts, of the system memory map may include the secure portions of the system memory map that may only be accessed by the processor while in the secure operating mode and while issuing a secure memory access transaction. The circumstances under which the processor may be in the secure operating mode and issuing a secure memory access transaction may occur less frequently and for shorter periods of time than when the processor may be in the non-secure operating mode and/or when the processor is in the secure operating mode and issuing a non-secure memory access transaction. Further the, circumstances under which the processor may be in the secure operating mode and issuing a non-secure memory access transaction may occur less frequently and for shorter periods of time than when the processor may be in the non-secure operating mode.

To make the secure portions of the system memory map available for secure memory access transactions by the processor operating in the secure mode, the parts of the memory device storing the secure portions of the system memory map may remain in a fully powered state. However, the power required to maintain the secure portions of the system memory map available for secure memory access transactions by the processor operating in the secure mode may be excessive for periods of time where the processor is operating in the non-secure mode and/or the processor is operating in the secure mode and issuing non-secure memory access transactions.

Embodiments described herein may be configured to reduce the power consumption by the parts of the memory device storing the secure portions of the system memory map. In particular, the embodiments described herein may be configured to reduce the power consumption by the parts of the memory device storing the secure portions of the system memory map for periods of time where the processor is operating in the non-secure mode and/or the processor is operating in the secure mode and issuing non-secure memory access transactions.

In some embodiments, a clock gating controller may be configured to control clock gating for secure portions of the system memory map according to the security type of a memory access transaction. In particular, the clock gating controller may gate a clock signal to parts of the memory device storing the secure portions of the system memory map in response to a memory access transaction being a non-secure memory access transaction. In some embodiments, a memory retention controller may be configured to control power to retain the secure portions of the system memory map according to the security operating mode of the processor. In particular, the memory retention controller may provide retention level power, which may be lower than a power level normally used when the secure portions of the system memory map are accessible by the processor, to parts of the memory device storing the secure portions of the system memory map in response to the processor being in a non-secure operating mode.

FIG. 1 illustrates a system including a computing device 10 suitable for use with various embodiments. The computing device 10 may include a system-on-chip (SoC) 12 with a processor 14, a memory 16, a communication interface 18, and a storage memory interface 20, a power manager 28, a clock gate controller 30, an interconnect 32, and a memory protection unit (MPU) 34. The computing device 10 may further include a communication component 22, such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, including static RAM (SRAM) and/or dynamic RAM (DRAM), or cache memory. These memories 16 may be configured to temporarily hold a limited amount of data received from a data sensor or subsystem, data and/or processor-executable code instructions that are requested from a non-volatile memory 16, 24, loaded to the memories 16 from the non-volatile memory 16, 24 in anticipation of future access based on a variety of factors, and/or intermediary processing data and/or processor-executable code instructions produced by the processor 14 and temporarily stored for future quick access without being stored in non-volatile memory 16, 24. The memory 16 may be configured to store data and processor-executable code in parts of the memory 16 configured to store data and processor-executable code for secure computing operations, referred to herein as a secure portion. The memory 16 may be configured to store data and processor-executable code in parts of the memory 16 configured to store data and processor-executable code for non-secure computing operations, referred to herein as a non-secure portion.

The MPU 34 may be configured to control access to the memory 16. The MPU 34 may control access to the memory 16 based on a security operating mode of the processor 14 attempting to access the memory 16. For example, the MPU 34 may allow the processor 14 to access a secure portion of the memory 16 in response to the processor 14 operating in a secure mode and may deny the processor 14 access to the secure portion of the memory 16 in response to the processor 14 operating in a non-secure mode. The MPU 34 may control access to the memory 16 based on a security type of a memory access transaction directed to the memory 16. For example, the MPU 34 may allow the processor 14 to access a secure portion of the memory 16 in response to the a security type of a memory access transaction being a secure memory access transaction and may deny the processor 14 access to the secure portion of the memory 16 in response to the security type of the memory access transaction being a non-secure memory access transaction.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

The power manager 28 may be configured to control power states of and/or power delivery to the components of the SoC 12. In some embodiments, the power manager 28 may be configured to signal power states to the components of the SoC 12 to prompt the components of the SoC 12 to transition to the signaled power states. In some embodiments, the power manager 28 may be configured to control amounts of power provided to the components of the SoC 12. For example, the power manager 28 may be configured to control connections between components of the SoC 12 and power rails (not shown). For another example, the power manager 28 may be configured to control amounts of power on power rails connected to the components of the SoC 12.

A clock gate controller 30 may be configured to control clock signals transmitted to the components of the SoC 12. In some embodiments, the clock gate controller 30 may be configured to signal clock states, such as gated or ungated, to components of the SoC 12 to prompt the components of the SoC 12 to transition to the clock state. For example, a component of the SoC 12 may transition to a gated clock state in response to receiving a gated clock state signal from the clock gate controller 30 by disconnecting from a clock signal and may transition to an ungated clock state in response to receiving an ungated clock state signal from the clock gate controller 30 by connecting to the clock signal. In some embodiments, the clock gate controller 30 may be configured to control clock signals to components of the SoC 12. For example, the clock gate controller 30 may disconnect a component of the SoC 12 from a clock signal to transition the component of the SoC 12 to a gated clock state and may connect the component of the SoC 12 to the clock signal to transition the component of the SoC 12 to an ungated clock state.

The interconnect 32 may be a communication fabric, such as a communication bus, configured to communicatively connect the components of the SoC 12. The interconnect 32 may transmit signals between the components of the SoC 12. In some embodiments, the interconnect 32 may be configured to control signals between the components of the SoC 12 by controlling timing and/or transmission paths of the signals.

Some or all of the components of the computing device 10 and/or the SoC 12 may be arranged differently and/or combined while still serving the functions of the various embodiments. The computing device 10 may not be limited to one of each of the components, and multiple instances of each component may be included in various configurations of the computing device 10.

Figure 2:
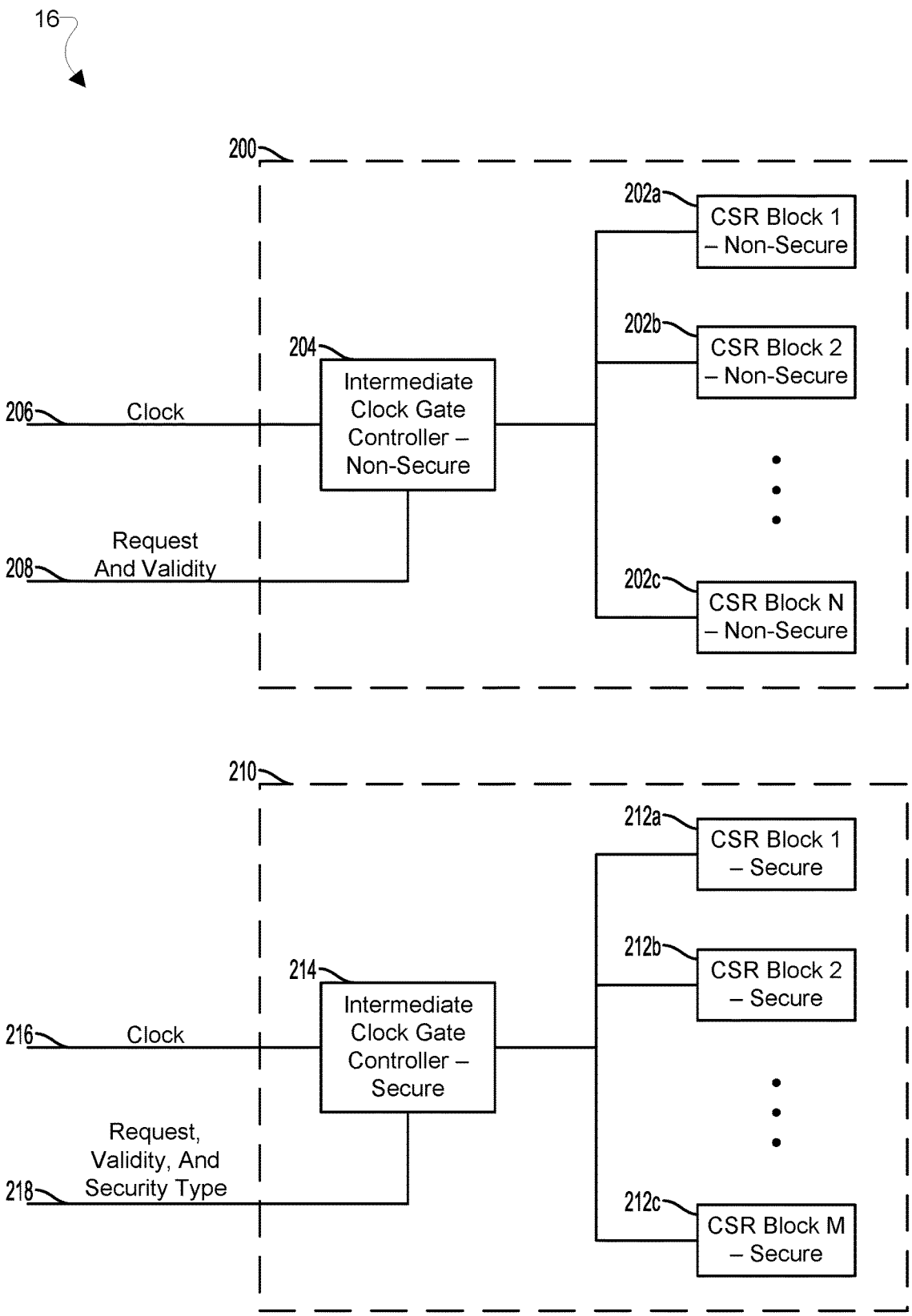
FIG. 2 is a component block diagram illustrating an example processor security mode based configuration and status register power management system for implementing various embodiments.

FIG. 2 illustrates an example processor security mode based configuration and status register (CSR) power management system for implementing various embodiments. With reference to FIGS. 1 and 2, a memory 16 (e.g., memory 16 in FIG. 1) may be register blocks/arrays divided into any number and combination of non-secure portions 200 and secure portions 210. The memory may include any number and combination of CSR blocks 202a, 202b, 202c, 212a, 212b, 212c. The CSR blocks 202a-202c, 212a-212c may be allocated in a non-secure portion 200 and a secure portion 210. For example, N number CSR blocks 202a-202c may be allocated to the non-secure portion 200 of the memory 16, where N may be any positive integer, and M number CSR blocks 212a-212c may be allocated to the secure portion 210 of the memory 16, where M may be any positive integer.

The memory 16 may include any number and combination of intermediate clock gate controllers 204, 214. A clock signal to the non-secure portion 200 and to the secure portion 210 of the memory 16 may be controlled by the intermediate clock gate controllers 204, 214. For the non-secure portion 200, the intermediate clock gate controller 204 may be configured to receive the clock signal on a clock input line 206 and a memory access transaction request signal and a validity signal on an input line 208. The memory access transaction request signal and the validity signal may be configured as an enable signal configured to prompt a response by the intermediate clock gate controller 204.

The intermediate clock gate controller 204 may be configured with a default setting for which the intermediate clock gate controller 204 gates the clock signal to the CSR blocks 202a-202c. The intermediate clock gate controller 204 may receive the enable signal. The intermediate clock gate controller 204 may be configured to interpret the enable signal. For example, the intermediate clock gate controller 204 may determine whether there is a valid memory access transaction request pending for the non-secure portion 200 of the memory 16 from the memory access transaction request signal and the validity signal. In response to determining that there is no valid memory access transaction request pending, the intermediate clock gate controller 204 may gate or continue to gate the clock signal, preventing the clock signal from being transmitted to the CSR blocks 202a-202c. In response to determining that there is a valid memory access transaction request pending, the intermediate clock gate controller 204 may ungate the clock signal and transmit the clock signal to the CSR blocks 202a-202c.

For the secure portion 210, the intermediate clock gate controller 214 may be configured to receive the clock signal on a clock input line 216 and a memory access transaction request signal, a validity signal, and a memory access transaction security type signal on an input line 218. The memory access transaction security type signal may be configured to indicate to the intermediate clock gate controller 214 whether the memory access transaction request signal is for a secure or a non-secure type memory access transaction request. For example, the memory access transaction security type signal may be a binary signal for which a first bit value may be assigned to indicate a secure type memory access transaction request and a second bit value may be assigned to indicate a non-secure type memory access transaction request. The memory access transaction security type signal may be configured in a variety of know manners to indicate whether the memory access transaction request signal is for a secure or a non-secure type memory access transaction request. The memory access transaction request signal, the validity signal, and the memory access transaction security type signal may be configured as an enable signal configured to prompt a response by the intermediate clock gate controller 214.

The intermediate clock gate controller 214 may be configured with a default setting for which the intermediate clock gate controller 214 gates the clock signal to the CSR blocks 212a-212c. The intermediate clock gate controller 214 may receive the enable signal. The intermediate clock gate controller 214 may be configured to interpret the enable signal. For example, the intermediate clock gate controller 214 may determine whether there is a valid secure memory access transaction request pending for the secure portion 210 of the memory 16 from the memory access transaction request signal, the validity signal, and the memory access transaction security type signal. In response to determining that there is no valid secure memory access transaction request pending, the intermediate clock gate controller 214 may gate or continue to gate the clock signal, preventing the clock signal from being transmitted to the CSR blocks 212a-212c. In response to determining that there is a valid secure memory access transaction request pending, the intermediate clock gate controller 214 may ungate the clock signal and transmit the clock signal to the CSR blocks 212a-212c.

In some embodiments, the clock signals may be the same signal to the non-secure portion 200 and to the secure portion 210 of the memory 16. In some embodiments, the clock signals may be different clock signals to the non-secure portion 200 and to the secure portion 210 of the memory 16. In some embodiments, the intermediate clock gate controllers 204, 214 may be separate components. In some embodiments, the intermediate clock gate controllers 204, 214 may be a single component configure to implement functions of the intermediate clock gate controllers 204, 214 for the non-secure portion 200 and the secure portion 210 of the memory 16.

Figure 3:
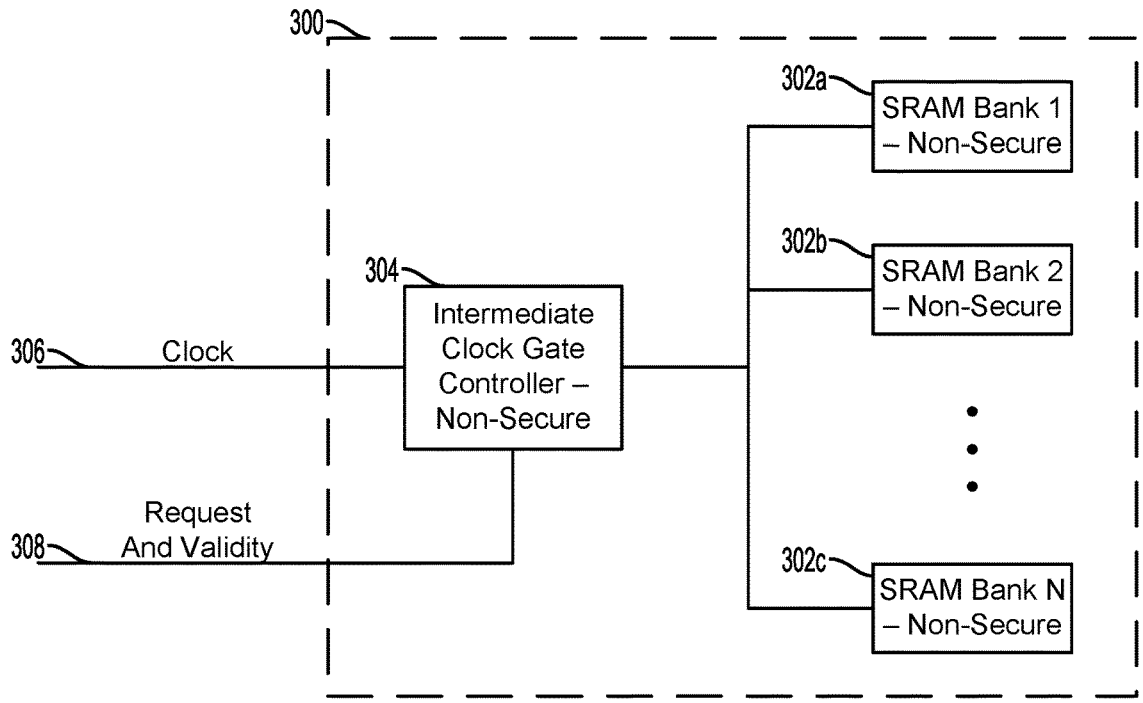
FIG. 3 is a component block diagram illustrating an example processor security mode based static random access memory bank power management system for implementing various embodiments.
Figure 3:
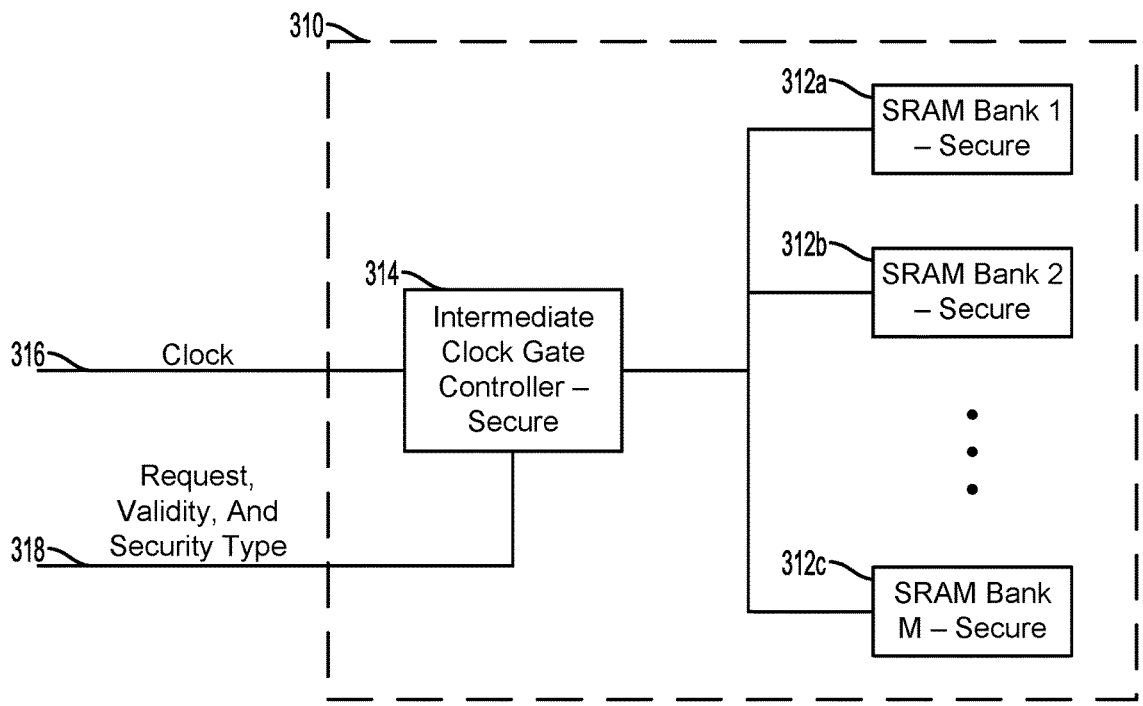

FIG. 3 illustrates an example processor security mode based SRAM power management system suitable for implementing various embodiments. With reference to FIGS. 1-3, a memory 16 (e.g., memory 16 in FIG. 1) may be an SRAM divided into any number and combination of non-secure portions 300 and secure portions 310. The memory may include any number and combination of SRAM banks 302a, 302b, 302c, 312a, 312b, 312c. The SRAM banks 302a-302c, 312a-312c may be allocated in a non-secure portion 300 and a secure portion 310. For example, N number SRAM banks 302a-302c may be allocated to the non-secure portion 300 of the memory 16, where N may be any positive integer, and M number SRAM banks 312a-312c may be allocated to the secure portion 310 of the memory 16, where M may be any positive integer.

The memory 16 may include any number and combination of intermediate clock gate controllers 304, 314. A clock signal to the non-secure portion 300 and to the secure portion 310 of the memory 16 may be controlled by the intermediate clock gate controllers 304, 314. For the non-secure portion 300, the intermediate clock gate controller 304 may be configured to receive the clock signal on a clock input line 306 and a memory access transaction request signal and a validity signal on an input line 308. The memory access transaction request signal and the validity signal may be configured as an enable signal configured to prompt a response by the intermediate clock gate controller 304.

The intermediate clock gate controller 304 may be configured with a default setting for which the intermediate clock gate controller 304 gates the clock signal to the SRAM banks 302a-302c. The intermediate clock gate controller 204 may receive the enable signal. The intermediate clock gate controller 304 may be configured to interpret the enable signal. For example, the intermediate clock gate controller 304 may determine whether there is a valid memory access transaction request pending for the non-secure portion 300 of the memory 16 from the memory access transaction request signal and the validity signal. In response to determining that there is no valid memory access transaction request pending, the intermediate clock gate controller 304 may gate or continue to gate the clock signal, preventing the clock signal from being transmitted to the SRAM banks 302a-302c. In response to determining that there is a valid memory access transaction request pending, the intermediate clock gate controller 304 may ungate the clock signal and transmit the clock signal to the SRAM banks 302a-302c.

For the secure portion 310, the intermediate clock gate controller 314 may be configured to receive the clock signal on a clock input line 316 and a memory access transaction request signal, a validity signal, and a memory access transaction security type signal on an input line 318. The memory access transaction security type signal may be configured to indicate to the intermediate clock gate controller 314 whether the memory access transaction request signal is for a secure or a non-secure type memory access transaction request. For example, the memory access transaction security type signal may be a binary signal for which a first bit value may be assigned to indicate a secure type memory access transaction request and a second bit value may be assigned to indicate a non-secure type memory access transaction request. The memory access transaction security type signal may be configured in a variety of know manners to indicate whether the memory access transaction request signal is for a secure or a non-secure type memory access transaction request. The memory access transaction request signal, the validity signal, and the memory access transaction security type signal may be configured as an enable signal configured to prompt a response by the intermediate clock gate controller 314.

The intermediate clock gate controller 314 may be configured with a default setting for which the intermediate clock gate controller 314 gates the clock signal to the SRAM banks 312a-312c. The intermediate clock gate controller 314 may receive the enable signal. The intermediate clock gate controller 314 may be configured to interpret the enable signal. For example, the intermediate clock gate controller 314 may determine whether there is a valid secure memory access transaction request pending for the secure portion 310 of the memory 16 from the memory access transaction request signal, the validity signal, and the memory access transaction security type signal. In response to determining that there is no valid secure memory access transaction request pending, the intermediate clock gate controller 314 may gate or continue to gate the clock signal, preventing the clock signal from being transmitted to the SRAM banks 312a-312c. In response to determining that there is a valid secure memory access transaction request pending, the intermediate clock gate controller 314 may ungate the clock signal and transmit the clock signal to the SRAM banks 312a-312c.

In some embodiments, the clock signals may be the same signal to the non-secure portion 300 and to the secure portion 310 of the memory 16. In some embodiments, the clock signals may be different clock signals to the non-secure portion 300 and to the secure portion 310 of the memory 16. In some embodiments, the intermediate clock gate controllers 304, 314 may be separate components. In some embodiments, the intermediate clock gate controllers 304, 314 may be a single component configured to implement functions of the intermediate clock gate controllers 304, 314 for the non-secure portion 300 and the secure portion 310 of the memory 16.

Figure 4:
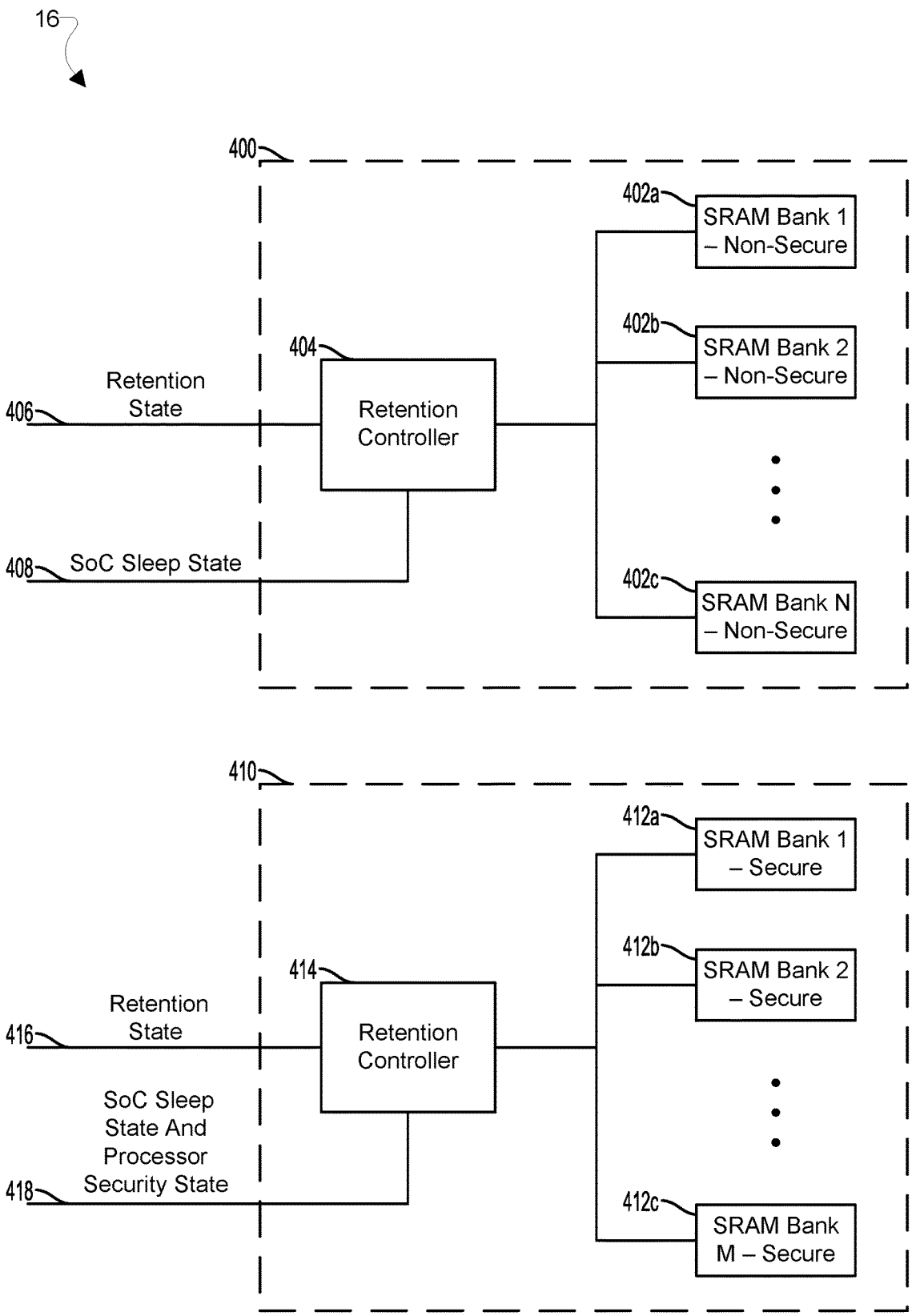
FIG. 4 is a component block diagram illustrating an example processor security mode based static random access memory bank power management system for implementing various embodiments.

FIG. 4 illustrates an example processor security mode based SRAM power management system for implementing various embodiments. With reference to FIGS. 1-4, a memory 16 (e.g., memory 16 in FIG. 1) may be an SRAM divided into any number and combination of non-secure portions 400 and secure portions 410. The memory may include any number and combination of SRAM banks 402a, 402b, 402c, 412a, 412b, 412c. The SRAM banks 402a-402c, 412a-412c may be allocated in a non-secure portion 400 and a secure portion 410. For example, N number SRAM banks 402a-402c may be allocated to the non-secure portion 400 of the memory 16, where N may be any positive integer, and M number SRAM banks 412a-412c may be allocated to the secure portion 410 of the memory 16, where M may be any positive integer.

The memory 16 may include any number and combination of retention controllers 404, 414. A retention signal to the non-secure portion 400 and to the secure portion 410 of the memory 16 may be controlled by the retention controllers 404, 414. The retention signal may be configured to set a power level of the SRAM banks 402a-402c, 412a-412c to a retention power level. The retention power level may be configured to retain data in the SRAM banks 402a-402c, 412a-412c at a lower power level than an awake power level used for when the SRAM banks 402a-402c, 412a-412c are accessed for a memory access request transaction. For the non-secure portion 400, the retention controller 404 may be configured to receive the retention signal on a retention input line 406 and an SoC sleep state signal on an input line 408. The SoC sleep state signal may be configured as an enable signal configured to prompt a response by the retention controller 404.

The retention controller 404 may be configured with a default setting for which the retention controller 404 may prevent transmission of the retention signal to the SRAM banks 402a-402c. The retention controller 404 may receive the enable signal. The retention controller 404 may be configured to interpret the enable signal. For example, the retention controller 404 may determine whether the SoC (e.g., SoC 12 in FIG. 1) is transitioning to or in a sleep state from the SoC sleep state signal. In response to determining that the SoC is not transitioning to or in a sleep state, the retention controller 404 may prevent or continue to prevent the retention signal from being transmitted to the SRAM banks 402a-402c. In response to determining that the SoC is transitioning to or in a sleep state, the retention controller 404 may transmit the retention signal to the SRAM banks 402a-402c.

For the secure portion 410, the retention controller 414 may be configured to receive the retention signal on a retention input line 416 and an SoC sleep state signal and a processor security state signal on an input line 418. The processor security state signal may be configured to indicate to the retention controller 414 a security operating mode for any number and combination of processors (e.g., processor 14 in FIG. 1). For example, each processor of the SoC may be associated with an individual processor security state signal. For another example, any number and combination of processors of the SoC, including all of the processors of the SoC, may be associated with a single processor security state signal. In some embodiments, the processor security state signal may be configured to indicate to the retention controller 414 a secure operating mode for at least one processor of the SoC or a non-secure operating mode for all of the processors of the SoC. For example, the processor security state signal may be a binary signal for which a first bit value may be assigned to indicate a secure operating mode for at least one processor of the SoC and a second bit value may be assigned to indicate a non-secure operating mode for all of the processors of the SoC. The processor security state signal may be configured in a variety of know manners to indicate whether processors are operating in a secure mode or in a non-secure mode. The SoC sleep state signal and the processor security state signal may be configured as an enable signal configured to prompt a response by the retention controller 414.

The retention controller 414 may be configured with a default setting for which the retention controller 414 may prevent transmission of the retention signal to the SRAM banks 412a-412c. The retention controller 414 may receive the enable signal. The retention controller 414 may be configured to interpret the enable signal. For example, the retention controller 414 may determine whether the SoC is transitioning to or in a sleep state from the SoC sleep state signal. For further example, the retention controller 414 may determine whether at least one processor of the SoC, including up to all of the processors of the SoC, is operating in a secure mode or whether all of the processors of the SoC are operating in a non-secure mode. In response to determining that the SoC is not transitioning to or in a sleep state, or in response to determining that at least one processor of the SoC is operating in a secure mode or that not all of the processors of the SoC are operating in a non-secure mode, the retention controller 414 may prevent or continue to prevent the retention signal from being transmitted to the SRAM banks 412a-412c. In response to determining that the SoC is transitioning to or in a sleep state, or in response to determining that no processor of the SoC is operating in a secure mode or that all of the processors of the SoC are operating in a non-secure mode, the retention controller 414 may transmit the retention signal to the SRAM banks 412a-412c.

In some embodiments, the retention signals may be the same signal to the non-secure portion 400 and to the secure portion 410 of the memory 16. In some embodiments, the retention signals may be different retention signals to the non-secure portion 400 and to the secure portion 410 of the memory 16. In some embodiments, the retention controllers 404, 414 may be separate components. In some embodiments, the retention controllers 404, 414 may be a single component configure to implement functions of the retention controllers 404, 414 for the non-secure portion 400 and the secure portion 410 of the memory 16.

In some embodiments, the examples illustrated in FIGS. 2-4 may illustrate components of the same memory 16 and may be combined. In some embodiments, the SRAM banks 302a-302c and the SRAM banks 402a-402c may be the same, and the intermediate clock gate controller 304 and the retention controller 404 may both be implemented for the SRAM banks 302a-302c, 402a-402c. Similarly, in some embodiments, the SRAM banks 312a-312c and the SRAM banks 412a-412c may be the same, and the intermediate clock gate controller 314 and the retention controller 414 may both be implemented for the SRAM banks 312a-312c, 412a-412c. In some embodiments, the non-secure portion 200, the non-secure portion 300, and the non-secure portion 400 of the memory 16 may be the same, and the CSR blocks 202a-202c and the SRAM banks 302a-302c, 402a-402c may be allocated in the non-secure portion 200, 300, 400. In some embodiments, the secure portion 210, the secure portion 310, and the secure portion 410 of the memory 16 may be the same, and the CSR blocks 212a-212c and the SRAM banks 312a-312c, 412a-412c may be allocated in the secure portion 210, 310, 410.

Figure 5:
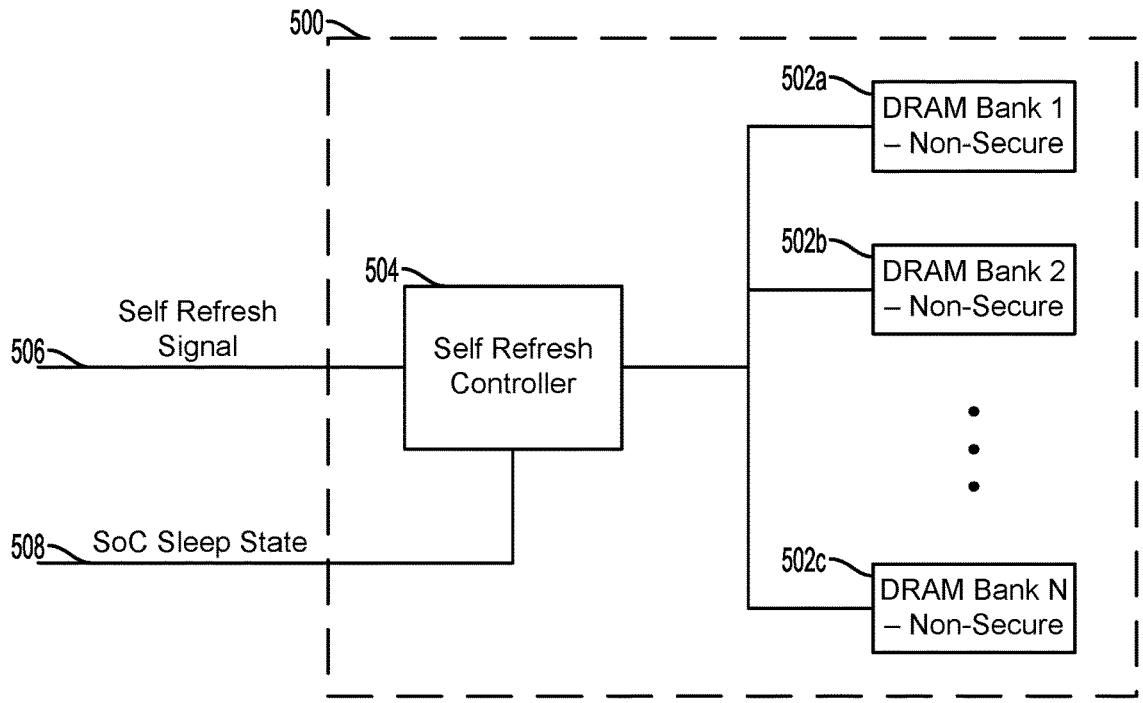
FIG. 5 is a component block diagram illustrating an example processor security mode based dynamic random access memory bank power management system for implementing various embodiments.
Figure 5:
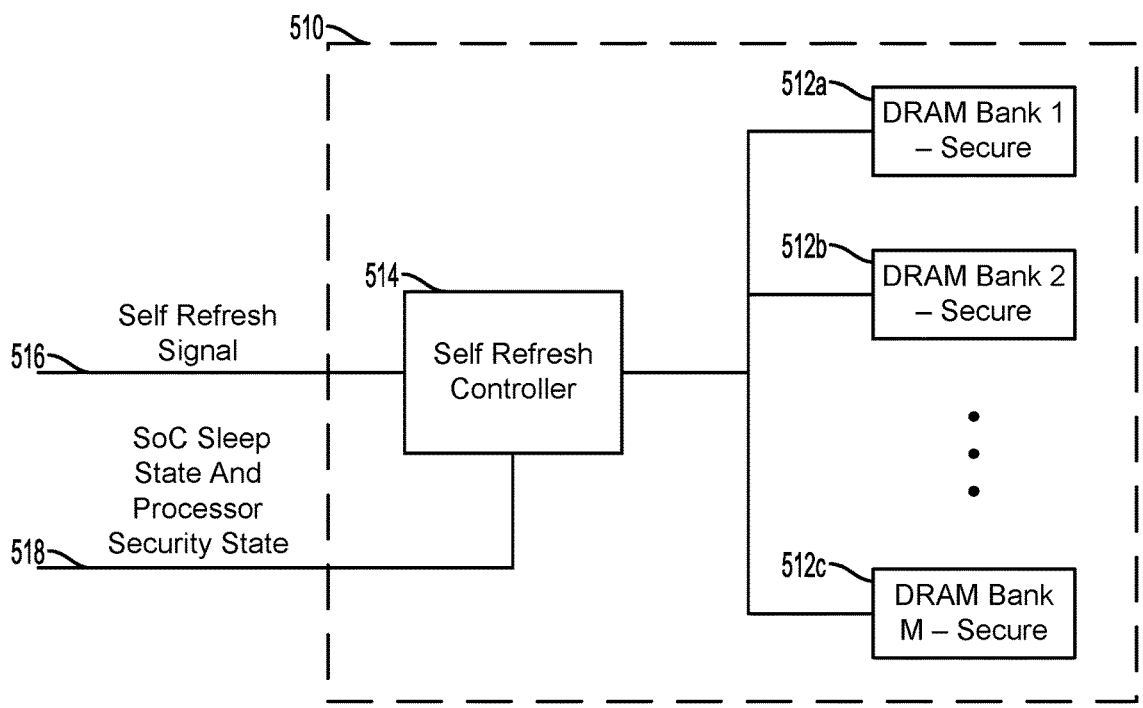

FIG. 5 illustrates an example processor security mode based DRAM power management system for implementing various embodiments. With reference to FIGS. 1-5, a memory 16 (e.g., memory 16 in FIG. 1) may be a DRAM divided into any number and combination of non-secure portions 500 and secure portions 510. The memory may include any number and combination of DRAM banks 502a, 502b, 502c, 512a, 512b, 512c. The DRAM banks 502a-502c, 512a-512c may be allocated in a non-secure portion 500 and a secure portion 510. For example, N number DRAM banks 502a-502c may be allocated to the non-secure portion 500 of the memory 16, where N may be any positive integer, and M number DRAM banks 512a-512c may be allocated to the secure portion 510 of the memory 16, where M may be any positive integer.

The memory 16 may include any number and combination of self refresh controllers 504, 514. A self refresh signal to the non-secure portion 500 and to the secure portion 510 of the memory 16 may be controlled by the self refresh controllers 504, 514. The self refresh signal may be configured to disable a clock signal (not shown) to the DRAM banks 502a-502c, 512a-512c and to set the refresh policy of the DRAM banks 502a-502c, 512a-512c to self refresh using an internal counter (not shown). For the non-secure portion 500, the self refresh controller 504 may be configured to receive the self refresh signal on a self refresh input line 506 and an SoC sleep state signal on an input line 508. The SoC sleep state signal may be configured as an enable signal configured to prompt a response by the self refresh controller 504.

The self refresh controller 504 may be configured with a default setting for which the self refresh controller 504 may prevent transmission of the self refresh signal to the DRAM banks 502a-502c. The self refresh controller 504 may receive the enable signal. The self refresh controller 504 may be configured to interpret the enable signal. For example, the self refresh controller 504 may determine whether the SoC (e.g., SoC 12 in FIG. 1) is transitioning to or in a sleep state from the SoC sleep state signal. In response to determining that the SoC is not transitioning to or in a sleep state, the self refresh controller 504 may prevent or continue to prevent the self refresh signal from being transmitted to the DRAM banks 502a-502c. In response to determining that the SoC is transitioning to or in a sleep state, the self refresh controller 504 may transmit the self refresh signal to the DRAM banks 502a-502c.

For the secure portion 510, the self refresh controller 514 may be configured to receive the self refresh signal on a self refresh input line 516 and an SoC sleep state signal and a processor security state signal on an input line 518. The processor security state signal may be configured to indicate to the self refresh controller 514 a security operating mode for any number and combination of processors (e.g., processor 14 in FIG. 1). For example, each processor of an SoC (e.g., SoC 12 in FIG. 1) may be associated with an individual processor security state signal. For another example, any number and combination of processors of an SoC, including all of the processors of the SoC, may be associated with a single processor security state signal. In some embodiments, the processor security state signal may be configured to indicate to the self refresh controller 514 a secure operating mode for at least one processor of the SoC or a non-secure operating mode for all of the processors of the SoC. For example, the processor security state signal may be a binary signal for which a first bit value may be assigned to indicate a secure operating mode for at least one processor of the SoC and a second bit value may be assigned to indicate a non-secure operating mode for all of the processors of the SoC. The processor security state signal may be configured in a variety of know manners to indicate whether processors are operating in a secure mode or in a non-secure mode. The SoC sleep state signal and the processor security state signal may be configured as an enable signal configured to prompt a response by the self refresh controller 514.

The self refresh controller 514 may be configured with a default setting for which the self refresh controller 514 may prevent transmission of the self refresh signal to the DRAM banks 512a-512c. The self refresh controller 514 may receive the enable signal. The self refresh controller 514 may be configured to interpret the enable signal. For example, the self refresh controller 514 may determine whether the SoC is transitioning to or in a sleep state from the SoC sleep state signal. For further example, the self refresh controller 514 may determine whether at least one processor of the SoC, including up to all of the processors of the SoC, is operating in a secure mode or whether all of the processors of the SoC are operating in a non-secure mode. In response to determining that the SoC is not transitioning to or in a sleep state, or in response to determining that at least one processor of the SoC is operating in a secure mode or that not all of the processors of the SoC are operating in a non-secure mode, the self refresh controller 514 may prevent or continue to prevent the self refresh signal from being transmitted to the DRAM banks 512a-512c. In response to determining that the SoC is transitioning to or in a sleep state, or in response to determining that no processor of the SoC is operating in a secure mode or that all of the processors of the SoC are operating in a non-secure mode, the self refresh controller 514 may transmit the self refresh signal to the DRAM banks 512a-512c.

In some embodiments, the self refresh signals may be the same signal to the non-secure portion 500 and to the secure portion 510 of the memory 16. In some embodiments, the self refresh signals may be different self refresh signals to the non-secure portion 500 and to the secure portion 510 of the memory 16. In some embodiments, the self refresh controllers 504, 514 may be separate components. In some embodiments, the self refresh controllers 504, 514 may be a single component configure to implement functions of the self refresh controllers 504, 514 for the non-secure portion 500 and the secure portion 510 of the memory 16.

Figure 6:
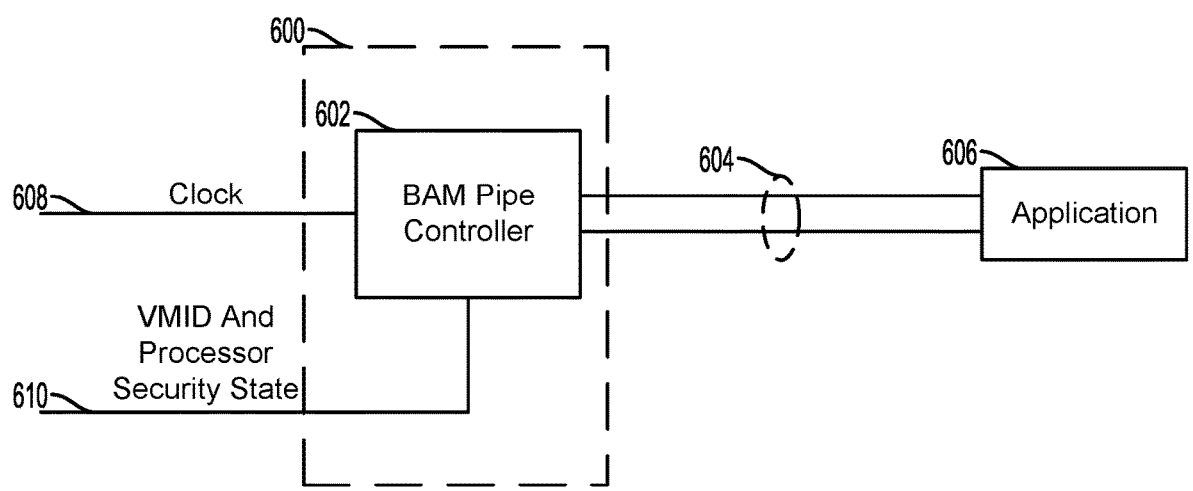
FIG. 6 is a component block diagram illustrating an example processor security mode based bus access manager pipe power management system for implementing various embodiments.

FIG. 6 illustrates an example processor security mode based bus access manager (BAM) pipe power management system for implementing various embodiments. With reference to FIGS. 1-6, a memory 16 (e.g., memory 16 in FIG. 1) may be a RAM having any number and combination of BAMs 600. The BAMs 600 may be configured to control access to any number and combination of BAM pipes 604 configured to transmit data to and from any number and combination of applications 606. An application 606 receiving and sending data via BAM pipes 604 may be executed in a Trust Zone, a hypervisor, and/or a high level operating system (HLOS). In some embodiments, the BAM 600 may be a component of a processor (e.g., processor 14 in FIG. 1) configured for encryption and/or decryption of the data transmitted via the BAM pipes 604.

A BAM 600 may include any number and combination of BAM pipe controllers 602. A clock signal to BAM pipes 604 may be controlled by a BAM pipe controller 602. The BAM pipe controller 602 may be configured to receive the clock signal on a clock input line 608 and a virtual machine identifier (VMID) signal and a processor security state signal on an input line 610. The processor security state signal may be configured to indicate to the BAM pipe controller 602 a security operating mode for any number and combination of processors (e.g., processor 14 in FIG. 1). For example, each processor of an SoC (e.g., SoC 12 in FIG. 1) may be associated with an individual processor security state signal. For another example, any number and combination of processors of an SoC, including all of the processors of the SoC, may be associated with a single processor security state signal. For example, the processor security state signal may be a binary signal for which a first bit value may be assigned to indicate a secure operating mode for at least one processor of the SoC and a second bit value may be assigned to indicate a non-secure operating mode for at least one processor of the SoC. The processor security state signal may be configured in a variety of know manners to indicate whether processors are operating in a secure mode or in a non-secure mode. Any processor associated with the processor security state signal may be identified via the VMID. The VMID and the processor security state signal may be configured as an enable signal configured to prompt a response by the BAM pipe controller 602.

The BAM pipe controller 602 may be configured with a default setting for which the BAM pipe controller 602 gates the clock signal to the BAM pipes 604. The BAM pipe controller 602 may receive the enable signal. The BAM pipe controller 602 may be configured to interpret the enable signal. For example, the BAM pipe controller 602 may determine whether a processor of the SoC is operating in a secure mode or in a non-secure mode. In response to determining the processor of the SoC is not operating in a secure mode or is operating in a non-secure mode, the BAM pipe controller 602 may gate or continue to gate the clock signal, preventing the clock signal from being transmitted to the BAM pipes 604. In response to determining that the processor of the SoC is operating in a secure mode or is not operating in a non-secure mode, the BAM pipe controller 602 may ungate the clock signal and transmit the clock signal to the BAM pipes 604. In some embodiments, the BAM pipe controller 602 may ungate the clock signal and transmit the clock signal to specific BAM pipes 604. For example, the BAM pipe controller 602 may ungate the clock signal and transmit the clock signal to BAM pipes 604 configured to transmit data to and from a secure application, such as the application 600 executed in a TrustZone or hypervisor on the SoC operating in the secure mode. In some embodiments, the BAM pipe controller 602 may not ungate the clock signal and transmit the clock signal to specific BAM pipes 604. For example, the BAM pipe controller 602 may not ungate the clock signal and transmit the clock signal to BAM pipes 604 configured to transmit data to and from an HLOS or a non-secure application.

Figure 7:
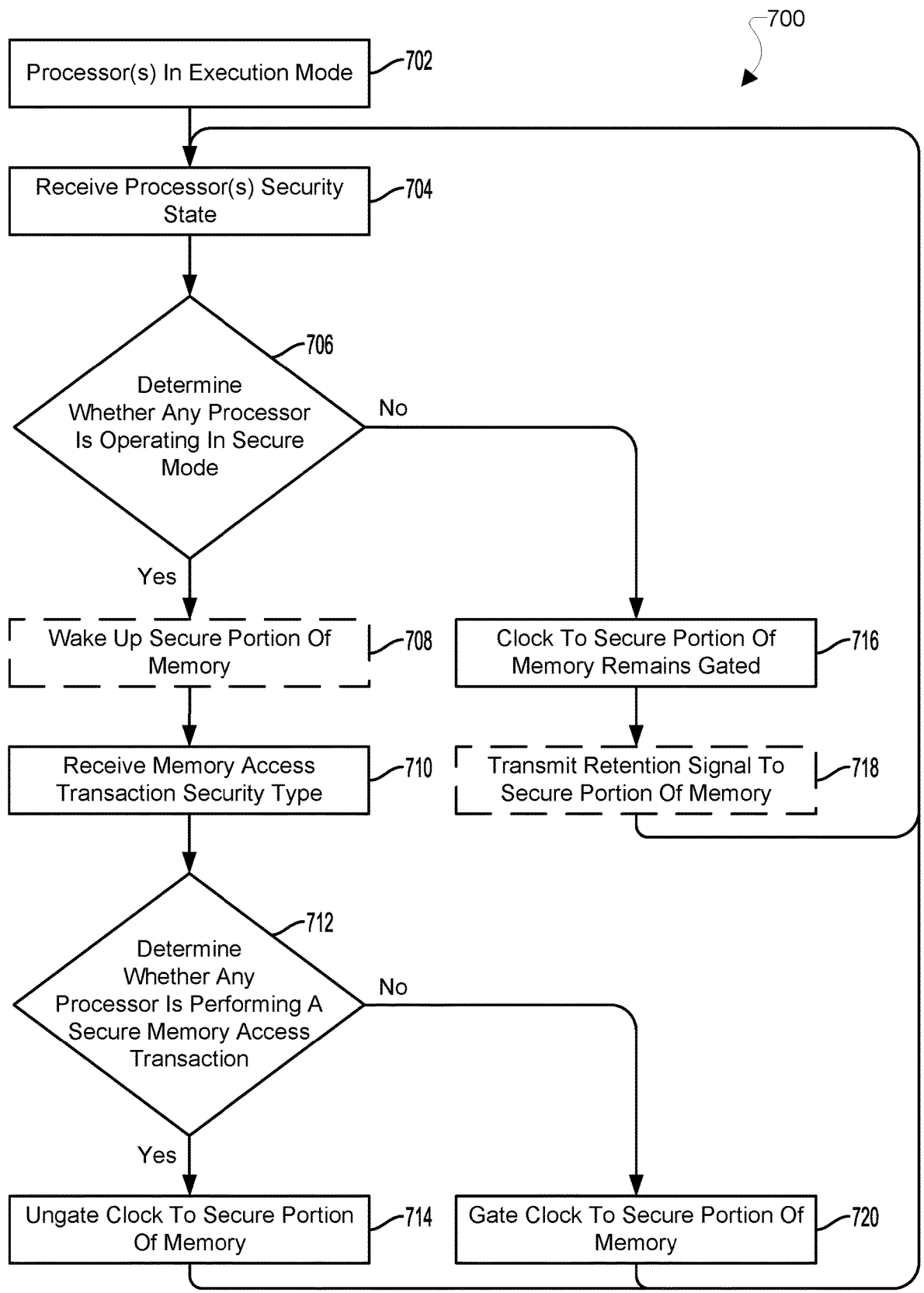
FIG. 7 is a process flow diagram illustrating a method for processor security mode based SoC infrastructure power management according to an embodiment.

FIG. 7 illustrates a method 700 for processor security mode based SoC infrastructure power management according to an embodiment. With reference to FIGS. 1-7, the method 700 may be implemented in a computing device (e.g., computing device 10 in FIG. 1), in software executing in a processor (e.g., processor 14, in FIG. 1), in general purpose hardware, in dedicated hardware (e.g., intermediate clock gate controllers 204, 214, 304, 314 in FIGS. 2 and 3, retention controllers 404, 414 in FIG. 4), or in a combination of a software-configured processor and dedicated hardware, such as a processor executing software within a memory power control system that includes other individual components (e.g., memory 16 in FIGS. 1-4, CSR blocks 202a, 202b, 202c, 212a, 212b, 212c in FIG. 2, SRAM banks 302a, 302b, 302c, 312a, 312b, 312c, 402a, 402b, 402c, 412a, 412b, 412c in FIGS. 3 and 4), and various memory/cache controllers. In order to encompass the alternative configurations enabled in various embodiments, the hardware implementing the method 700 is referred to herein as a "power management controller."

In block 702, any number and combination of processors of an SoC may be in a mission mode. The processors in the mission mode may be in a mode in which the processors are able to execute processes. As an example, mission mode may be different from a sleep mode or low power mode in which a processor may not be in a mode in which the processors may be able to execute processes. The processor may have to wake up from the sleep mode or low power mode to transition to the mission mode to be able to execute processes.

In block 704, the power management controller may receive a processor security state signal. In some embodiments, the power management controller receiving the processor security state signal in block 704 may be a retention controller. The processor security state signal may be configured to indicate to the power management controller a security operating mode for any number and combination of processors. For example, each processor of an SoC (e.g., SoC 12 in FIG. 1) may be associated with an individual processor security state signal. For another example, any number and combination of processors of the SoC, including all of the processors of the SoC, may be associated with a single processor security state signal. In some embodiments, the processor security state signal may be configured to indicate to the power management controller a secure operating mode for at least one processor of the SoC or a non-secure operating mode for all of the processors of the SoC. For example, the processor security state signal may be a binary signal for which a first bit value may be assigned to indicate a secure operating mode for at least one processor of the SoC and a second bit value may be assigned to indicate a non-secure operating mode for all of the processors of the SoC. The processor security state signal may be configured in a variety of know manners to indicate whether processors are operating in a secure mode or in a non-secure mode.

In some embodiments, the processor security state signal may be received as part of an enable signal for the power management controller. In some embodiments, the enable signal may include the processor security state signal and an SoC sleep state signal. The SoC sleep state signal may be configured to indicate to the power management controller a power state of the SoC, such as whether the SoC is in or transitioning to a low power state or a sleep state. The enable signal may be configured to prompt a response by the power management controller.

In determination block 706, the power management controller may determine whether any processor is operating in a secure mode. The power management controller may be configured to interpret the processor security state signal. The power management controller may determine whether at least one processor of the SoC is operating in a secure mode or whether all of the processors of the SoC are operating in a non-secure mode. In some embodiments, the power management controller determining whether any processor is operating in a secure mode in determination block 706 may be a retention controller.

In response to determining that no processor is operating in a secure mode (i.e., determination block 706="No"), the power management controller may gate or continue to gate a received clock signal, preventing the clock signal from being transmitted to a secure portion of a memory, in block 716. In some embodiments, the power management controller may be configured with a default setting for which the power management controller gates the clock signal to the secure portion (e.g., secure portion 310, 410 in FIGS. 3 and 4) of the memory. In some embodiments, the power management controller may have previously gated the clock signal to the secure portion of the memory. In some embodiments, the power management controller may gate or continue to gate a received clock signal, preventing the clock signal from being transmitted to CSR blocks in a secure portion of register blocks/arrays and/or SRAM banks in a secure portion of an SRAM. In some embodiments, the power management controller gating or continuing to gate the received clock signal in block 716 may be an intermediate clock gate controller.

In optional block 718, the power management controller may transmit or continue to transmit a received retention signal to the secure portion of the memory. In some embodiments, the power management controller may be configured with a default setting for which the power management controller may prevent transmission of the retention signal to the memory banks in the secure portion of the memory. The retention signal may be configured to set a power level of memory banks to a retention power level. The retention power level may be configured to retain data in the memory banks at a lower power level than an awake power level used for when the memory banks are accessed for a memory access request transaction. In some embodiments, the power management controller may transmit a received retention signal to the SRAM banks in the secure portion of the SRAM. In some embodiments, the power management controller transmitting or continuing to transmit the received retention signal to the secure portion of the memory in optional block 718 may be a retention controller. The power management controller may continually, repeatedly, periodically, or episodically repeat the method 700 by again receiving a processor security state signal in block 704.

In response to determining that a processor is operating in a secure mode (i.e., determination block 706="Yes"), the power management controller may wake up the secure portion of the memory in optional block 708. In some embodiments, the power management controller may prevent transmitting the received retention signal to the SRAM banks in the secure portion of the SRAM. In some embodiments, the power management controller waking up the secure portion of the memory in optional block 708 may be a retention controller.

In block 710, the power management controller may receive a memory access transaction security type signal. In some embodiments, the power management controller receiving the memory access transaction security type signal in block 710 may be an intermediate clock gate controller. The memory access transaction security type signal may be configured to indicate to the power management controller whether a memory access transaction request signal is for a secure or a non-secure type memory access transaction request. For example, the memory access transaction security type signal may be a binary signal for which a first bit value may be assigned to indicate a secure type memory access transaction request and a second bit value may be assigned to indicate a non-secure type memory access transaction request. The memory access transaction security type signal may be configured in a variety of know manners to indicate whether the memory access transaction request signal is for a secure or a non-secure type memory access transaction request.

In some embodiments, the memory access transaction security type signal may be received as part of an enable signal for the power management controller. In some embodiments, the enable signal may include a memory access transaction request signal and/or a validity signal. The enable signal may be configured to prompt a response by the transmitting power management controller.

In determination block 712, the power management controller may determine whether any processor is performing a secure memory transaction. The power management controller may be configured to interpret the transaction security type signal. The power management controller may determine whether at least one processor of the SoC is performing a secure memory transaction. In some embodiments, determining that a processor is performing a secure memory transaction may include determining that there is a secure memory access transaction request pending for the secure portion of the memory. In some embodiments, the power management controller determining whether any processor is performing a secure memory transaction in determination block 712 may be an intermediate clock gate controller.

In response to determining that a processor is performing a secure memory transaction (i.e., determination block 712="Yes"), the power management controller may ungate the clock signal to the secure portion of the memory in block 714. In some embodiments, the power management controller may be configured with a default setting for which the power management controller gates the clock signal to the secure portion of the memory. In some embodiments, the ungating power management controller may have previously gated the clock signal to the secure portion of the memory. In some embodiments, the power management controller may be configured with a default setting for which the power management controller gates the clock signal to the secure portion of register blocks/arrays and/or the secure portion of the SRAM. In some embodiments, the power management controller may ungate the received clock signal, transmitting the clock signal to the CSR blocks in the secure portion of register blocks/arrays and/or the SRAM banks in the secure portion of the SRAM. In some embodiments, the power management controller ungating the clock signal to the secure portion of the memory in block 714 may be an intermediate clock gate controller. The power management controller may continually, repeatedly, periodically, or episodically repeat the method 700 by again receiving a processor security state signal in block 704.

In response to determining that a processor is not performing a secure memory transaction (i.e., determination block 712="No"), the power management controller may gate or continue to gate the clock signal to the secure portion of the memory in block 720. In some embodiments, the power management controller may be configured with a default setting for which the power management controller gates the clock signal to the secure portion of the memory. In some embodiments, the power management controller may be configured with a default setting for which the power management controller gates the clock signal to the secure portion of register blocks/arrays and/or the secure portion of the SRAM. In some embodiments, the power management controller may have previously ungated the clock signal to the secure portion of the memory. In some embodiments, the power management controller may gate or continue to gate the received clock signal, preventing the clock signal from being transmitted to the CSR blocks in the secure portion of register blocks/arrays and/or the SRAM banks in the secure portion of the SRAM. In some embodiments, the power management controller gating the clock signal to the secure portion of the memory in block 720 may be an intermediate clock gate controller. The power management controller may continually, repeatedly, periodically, or episodically receive a processor security state signal in block 704.

Figure 8:
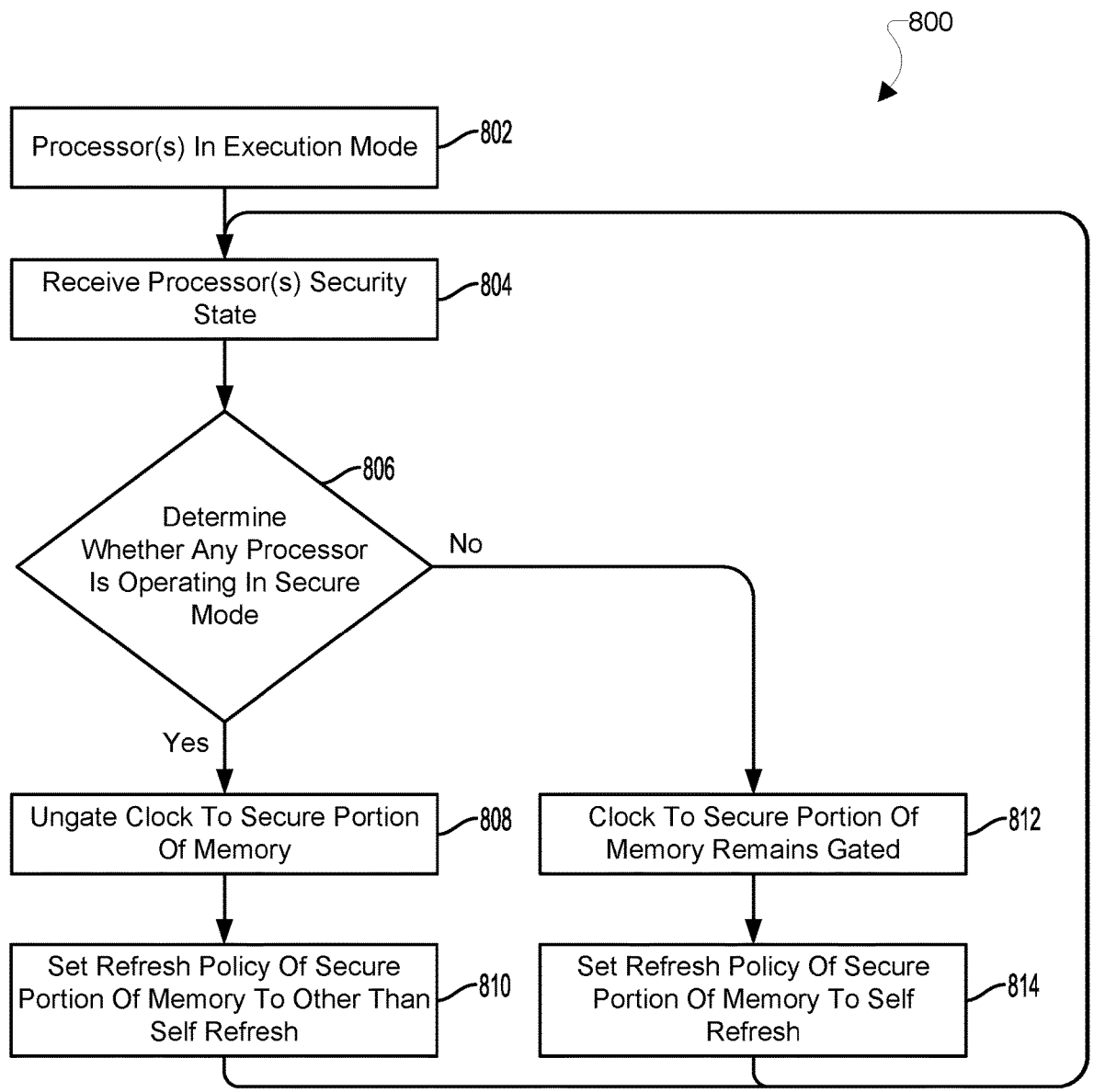
FIG. 8 is a process flow diagram illustrating a method for processor security mode based SoC infrastructure power management according to an embodiment.

FIG. 8 illustrates a method 800 for processor security mode based SoC infrastructure power management according to an embodiment. With reference to FIGS. 1-8, the method 800 may be implemented in a computing device (e.g., computing device 10 in FIG. 1), in software executing in a processor (e.g., processor 14, in FIG. 1), in general purpose hardware, in dedicated hardware (e.g., self refresh controllers 504, 514 in FIG. 5), or in a combination of a software-configured processor and dedicated hardware, such as a processor executing software within a memory power control system that includes other individual components (e.g., memory 16 in FIGS. 1 and 5, DRAM banks 502a, 502b, 502c, 512a, 512b, 512c in FIG. 5), and various memory/cache controllers. In order to encompass the alternative configurations enabled in various embodiments, the hardware implementing the method 800 is referred to herein as a "power management controller."

In block 802, any number and combination of processors of an SoC may be in a mission mode. The processors in the mission mode may be in a mode in which the processors are able to execute processes. As an example, mission mode may be different from a sleep mode or low power mode in which a processor may not be in a mode in which the processors may be able to execute processes. The processor may have to wake up from the sleep mode or low power mode to transition to the mission mode to be able to execute processes.

In block 804, the power management controller may receive a processor security state signal. In some embodiments, the power management controller receiving the processor security state signal in block 804 may be a self refresh controller. The processor security state signal may be configured to indicate to the power management controller a security operating mode for any number and combination of processors. For example, each processor of an SoC (e.g., SoC 12 in FIG. 1) may be associated with an individual processor security state signal. As another example, any number and combination of processors of the SoC, including all of the processors of the SoC, may be associated with a single processor security state signal.

In some embodiments, the processor security state signal may be configured to indicate to the power management controller a secure operating mode for at least one processor of the SoC or a non-secure operating mode for all of the processors of the SoC. For example, the processor security state signal may be a binary signal for which a first bit value may be assigned to indicate a secure operating mode for at least one processor of the SoC and a second bit value may be assigned to indicate a non-secure operating mode for all of the processors of the SoC. The processor security state signal may be configured in a variety of know manners to indicate whether processors are operating in a secure mode or in a non-secure mode.

In some embodiments, the processor security state signal may be received as part of an enable signal for the power management controller. In some embodiments, the enable signal may include the processor security state signal and an SoC sleep state signal. The SoC sleep state signal may be configured to indicate to the power management controller a power state of the SoC, such as whether the SoC is in or transitioning to a low power state or a sleep state. The enable signal may be configured to prompt a response by the power management controller.

In determination block 806, the power management controller may determine whether any processor is operating in a secure mode. The power management controller may be configured to interpret the processor security state signal. The power management controller may determine whether at least one processor of the SoC is operating in a secure mode or whether all of the processors of the SoC are operating in a non-secure mode. In some embodiments, the power management controller determining whether any processor is operating in a secure mode in determination block 806 may be a self refresh controller.

In response to determining that no processor is operating in a secure mode (i.e., determination block 806="No"), the power management controller may gate or continue to gate a received clock signal in block 812, thereby preventing the clock signal from being transmitted to a secure portion of a memory. In some embodiments, the power management controller may be configured with a default setting for which the power management controller gates the clock signal to the secure portion (e.g., secure portion 510 in FIG. 5) of the memory. In some embodiments, the power management controller may have previously gated the clock signal to the secure portion of the memory. In some embodiments, the power management controller may gate or continue to gate a received clock signal, preventing the clock signal from being transmitted to DRAM banks in a secure portion of a DRAM. In some embodiments, the power management controller gating or continuing to gate the received clock signal in block 812 may be a self refresh controller.

In block 814, the power management controller may transmit or continue to transmit a received self refresh signal to the secure portion of the memory. In some embodiments, the power management controller may be configured with a default setting for which the power management controller may prevent transmission of the self refresh signal to the memory banks in the secure portion of the memory. The self refresh signal may be configured to set a refresh policy of the memory banks to self refresh using an internal counter. The self refresh policy may be configured to retain data in the memory banks at a lower power level than a power level used for other refresh policies using clock signals external to the memory when the memory banks are ungated and accessible for a memory access request transaction. In some embodiments, the power management controller may transmit a self refresh signal to the DRAM banks in the secure portion of the DRAM. In some embodiments, the power management controller transmitting or continuing to transmit the received self refresh signal to the secure portion of the memory in block 814 may be a self refresh controller. The power management controller may continually, repeatedly, periodically, or episodically repeat the method 800 by again receiving a processor security state signal in block 804.

In response to determining that a processor is operating in a secure mode (i.e., determination block 806="Yes"), the power management controller may ungate the clock signal to the secure portion of the memory in block 808. In some embodiments, the power management controller may be configured with a default setting for which the power management controller gates the clock signal to the secure portion of the memory. In some embodiments, the ungating power management controller may have previously gated the clock signal to the secure portion of the memory. In some embodiments, the power management controller may be configured with a default setting for which the power management controller gates the clock signal to the secure portion of the DRAM. In some embodiments, the power management controller may ungate the received clock signal, transmitting the clock signal to the DRAM banks in the secure portion of the DRAM. In some embodiments, the power management controller ungating the clock signal to the secure portion of the memory in block 808 may be a self refresh controller.

In block 810, the power management controller may prevent transmitting the received self refresh signal to the secure portion of the memory. By preventing transmission of the self refresh signal to the memory, the memory may set a refresh policy to a refresh policy other than self refresh, such as auto refresh. In some embodiments, the power management controller may prevent transmitting the self refresh signal to the DRAM banks in the secure portion of the DRAM. In some embodiments, the power management controller preventing transmitting the received self refresh signal to the secure portion of the memory in block 810 may be a self refresh controller. The power management controller may continually, repeatedly, periodically, or episodically repeat the method 800 by again receiving a processor security state signal in block 804.

Figure 9:
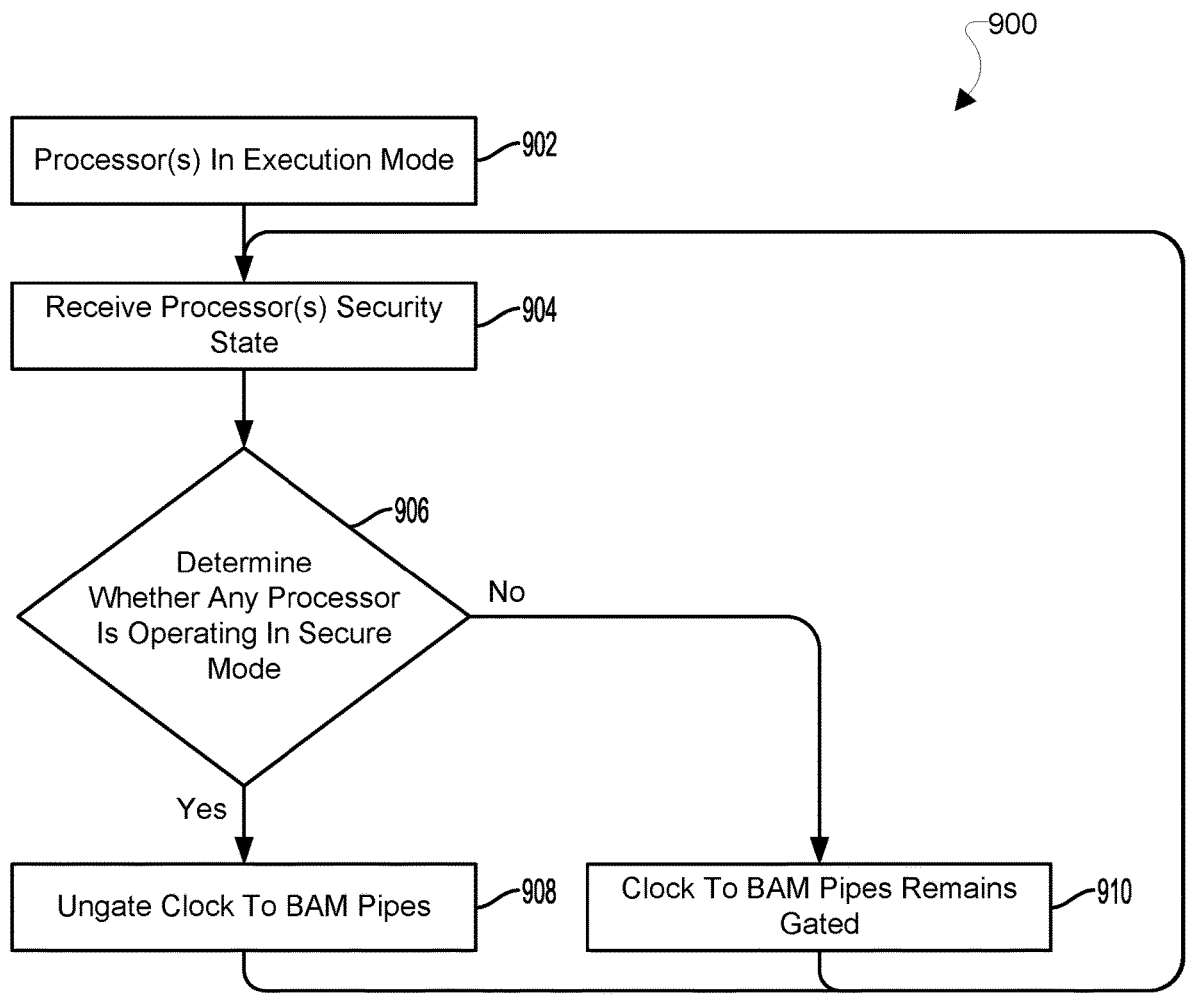
FIG. 9 is a process flow diagram illustrating a method for processor security mode based SoC infrastructure power management according to an embodiment.

FIG. 9 illustrates a method 900 for processor security mode based SoC infrastructure power management according to an embodiment. With reference to FIGS. 1-9, the method 900 may be implemented in a computing device (e.g., computing device 10 in FIG. 1), in software executing in a processor (e.g., processor 14, in FIG. 1), in general purpose hardware, in dedicated hardware (e.g., BAM pipe controller 602 in FIG. 6), or in a combination of a software-configured processor and dedicated hardware, such as a processor executing software within a memory power control system that includes other individual components (e.g., memory 16 in FIG. 1, BAM 600, BAM pipes 604 in FIG. 5), and various memory/cache controllers. In order to encompass the alternative configurations enabled in various embodiments, the hardware implementing the method 900 is referred to herein as a "power management controller."

In block 902, any number and combination of processors of an SoC may be in a mission mode. The processors in the mission mode may be in a mode in which the processors are able to execute processes. As an example, mission mode may be different from a sleep mode or low power mode in which a processor may not be in a mode in which the processors are able to execute processes. The processor may have to wake up from the sleep mode or low power mode to transition to the mission mode to be able to execute processes.

In block 904, the power management controller may receive a processor security state signal. In some embodiments, the power management controller receiving the processor security state signal in block 904 may be a BAM pipe controller. The processor security state signal may be configured to indicate to the power management controller a security operating mode for any number and combination of processors. For example, each processor of an SoC (e.g., SoC 12 in FIG. 1) may be associated with an individual processor security state signal. As another example, any number and combination of processors of the SoC, including all of the processors of the SoC, may be associated with a single processor security state signal. In some embodiments, the processor security state signal may be configured to indicate to the power management controller a secure operating mode for at least one processor of the SoC or a non-secure operating mode for all of the processors of the SoC. For example, the processor security state signal may be a binary signal for which a first bit value may be assigned to indicate a secure operating mode for at least one processor of the SoC and a second bit value may be assigned to indicate a non-secure operating mode for all of the processors of the SoC. The processor security state signal may be configured in a variety of know manners to indicate whether processors are operating in a secure mode or in a non-secure mode.

In some embodiments, the processor security state signal may be received as part of an enable signal for the power management controller. In some embodiments, the enable signal may include the processor security state signal and a VMID signal. Any processor associated with the processor security state signal may be identified via the VMID. The enable signal may be configured to prompt a response by the power management controller.

In determination block 906, the power management controller may determine whether any processor is operating in a secure mode. The power management controller may be configured to interpret the processor security state signal. The power management controller may determine whether at least one processor of the SoC is operating in a secure mode or whether all of the processors of the SoC are operating in a non-secure mode. In some embodiments, the power management controller determining whether any processor is operating in a secure mode in determination block 906 may be a BAM pipe controller.

In response to determining that no processor is operating in a secure mode (i.e., determination block 906="No"), the power management controller may gate or continue to gate a received clock signal in block 910, thereby preventing the clock signal from being transmitted to a BAM pipe. In some embodiments, the power management controller may be configured with a default setting for which the power management controller gates the clock signal to the BAM pipe. In some embodiments, the power management controller may have previously gated the clock signal to the BAM pipe. In some embodiments, the power management controller may gate or continue to gate a received clock signal, preventing the clock signal from being transmitted to a BAM pipe configured to transmit data to and from a secure application (e.g., application 600 in FIG. 6) executed in a TrustZone or hypervisor on the SoC operating in the secure mode. In some embodiments, the power management controller gating or continuing to gate the received clock signal in block 910 may be a BAM pipe controller. The power management controller may continually, repeatedly, periodically, or episodically repeat the method 900 by again receiving a processor security state signal in block 904.

In response to determining that a processor is operating in a secure mode (i.e., determination block 906="Yes"), the power management controller may ungate the clock signal to the BAM pipe in block 908. In some embodiments, the power management controller may be configured with a default setting for which the power management controller gates the clock signal to the BAM pipe. In some embodiments, the ungating power management controller may have previously gated the clock signal to the BAM pipe. In some embodiments, the power management controller may be configured with a default setting for which the power management controller gates the clock signal to the BAM pipe configured to transmit data to and from the secure application executed in the TrustZone or hypervisor on the SoC operating in the secure mode. In some embodiments, the power management controller ungating the clock signal to the BAM pipe in block 908 may be a BAM pipe controller. The power management controller may continually, repeatedly, periodically, or episodically repeat the method 900 by again receiving a processor security state signal in block 904.

Figure 10:
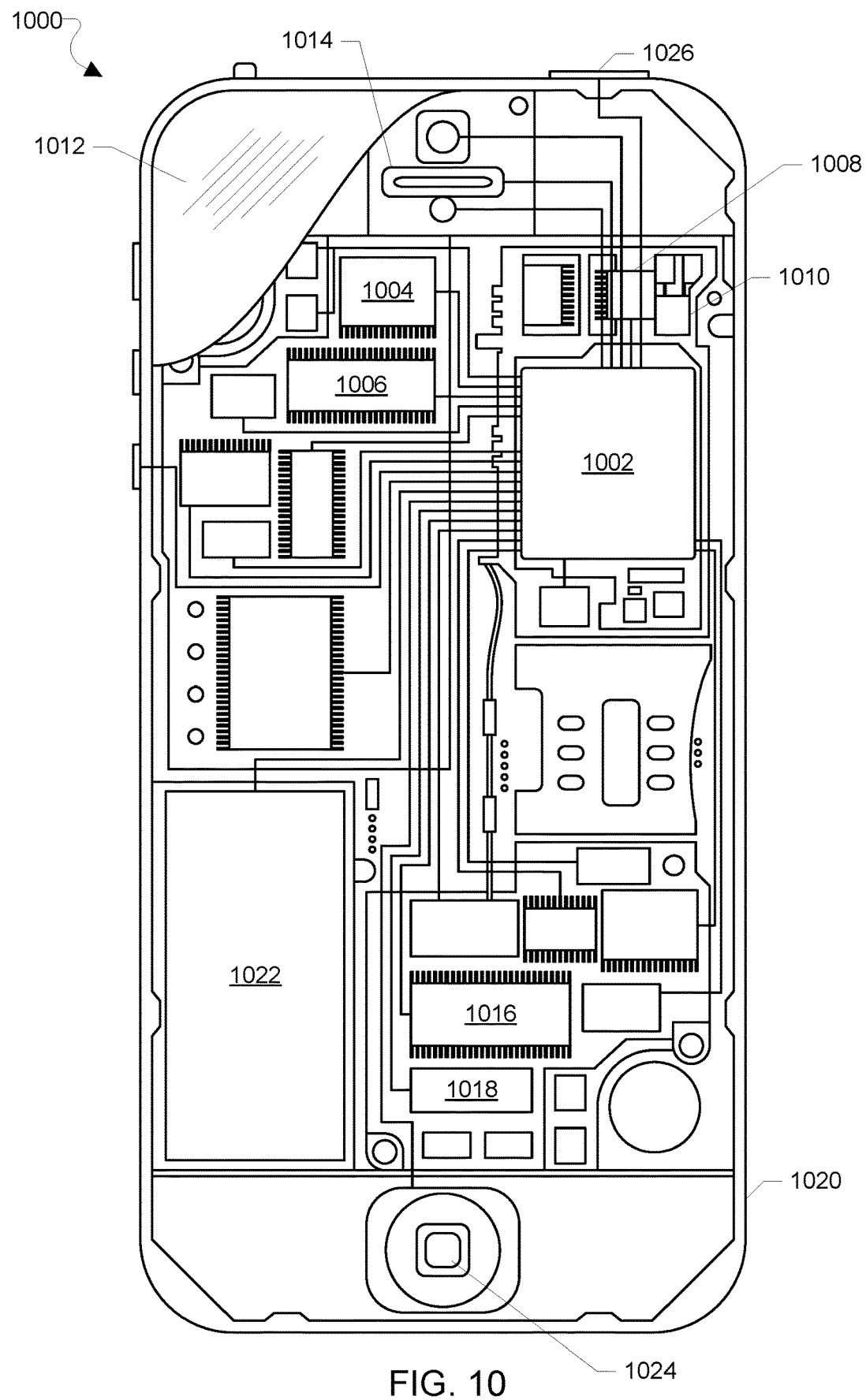
FIG. 10 is a component block diagram illustrating an example mobile computing device suitable for use with the various embodiments.

Various embodiments (including, but not limited to, embodiments described above with reference to FIGS. 1-9) may be implemented in a wide variety of computing systems including mobile computing devices, an example of which suitable for use with the various embodiments is illustrated in FIG. 10. The mobile computing device 1000 may include a processor 1002 coupled to a touchscreen controller 1004 and an internal memory 1006. The processor 1002 may be one or more multicore integrated circuits designated for general or specific processing tasks. The internal memory 1006 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the mobile computing device 1000 need not have touch screen capability.

The mobile computing device 1000 may have one or more radio signal transceivers 1008 (e.g., Peanut, Bluetooth, ZigBee, Wi-Fi, RF radio) and antennae 1010, for sending and receiving communications, coupled to each other and/or to the processor 1002. The transceivers 1008 and antennae 1010 may be used with the above-mentioned circuitry to implement the various wireless transmission protocol stacks and interfaces. The mobile computing device 1000 may include a cellular network wireless modem chip 1016 that enables communication via a cellular network and is coupled to the processor.

The mobile computing device 1000 may include a peripheral device connection interface 1018 coupled to the processor 1002. The peripheral device connection interface 1018 may be singularly configured to accept one type of connection, or may be configured to accept various types of physical and communication connections, common or proprietary, such as Universal Serial Bus (USB), FireWire, Thunderbolt, or PCIe. The peripheral device connection interface 1018 may also be coupled to a similarly configured peripheral device connection port (not shown).

The mobile computing device 1000 may also include speakers 1014 for providing audio outputs. The mobile computing device 1000 may also include a housing 1020, constructed of a plastic, metal, or a combination of materials, for containing all or some of the components described herein. The mobile computing device 1000 may include a power source 1022 coupled to the processor 1002, such as a disposable or rechargeable battery. The rechargeable battery may also be coupled to the peripheral device connection port to receive a charging current from a source external to the mobile computing device 1000. The mobile computing device 1000 may also include a physical button 1024 for receiving user inputs. The mobile computing device 1000 may also include a power button 1026 for turning the mobile computing device 1000 on and off.

Figure 11:
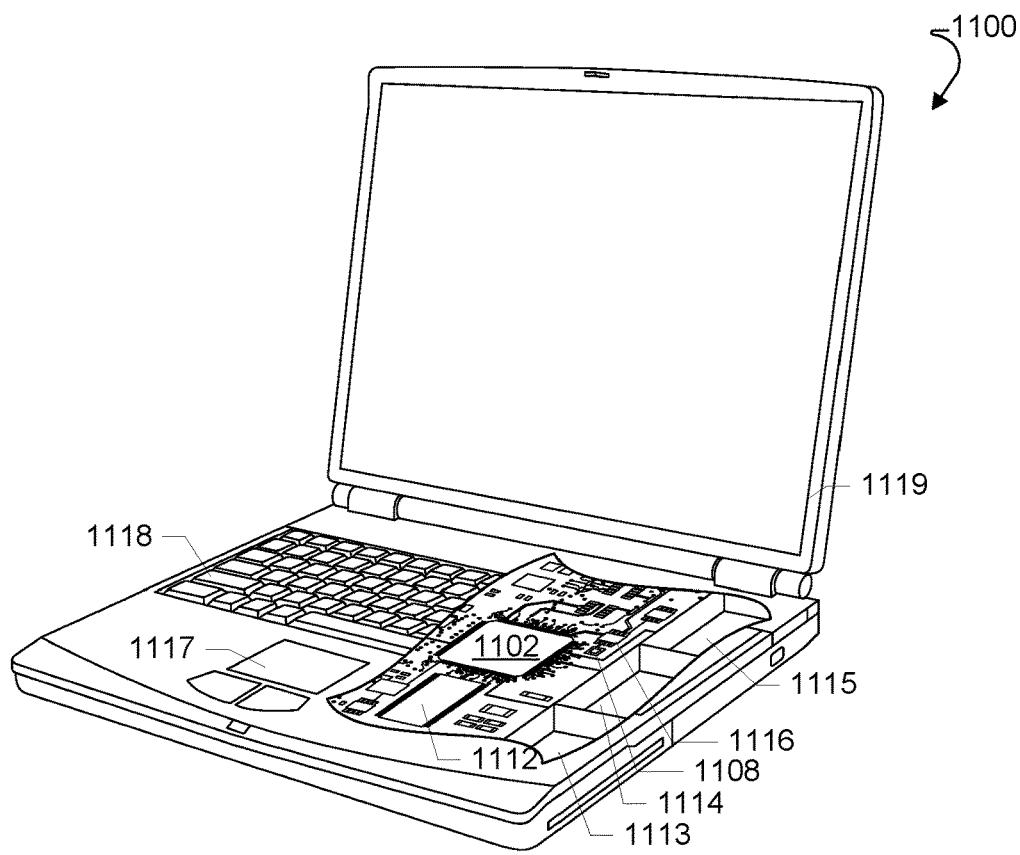
FIG. 11 is a component block diagram illustrating an example mobile computing device suitable for use with the various embodiments.

The various embodiments (including, but not limited to, embodiments described above with reference to FIGS. 1-9) may be implemented in a wide variety of computing systems include a laptop computer 1100 an example of which is illustrated in FIG. 11. Many laptop computers include a touchpad touch surface 1117 that serves as the computer's pointing device, and thus may receive drag, scroll, and flick gestures similar to those implemented on computing devices equipped with a touch screen display and described above. A laptop computer 1100 will typically include a processor 1102 coupled to volatile memory 1112 and a large capacity nonvolatile memory, such as a disk drive 1113 of Flash memory. Additionally, the computer 1100 may have one or more antenna 1108 for sending and receiving electromagnetic radiation that may be connected to a wireless data link and/or cellular telephone transceiver 1116 coupled to the processor 1102. The computer 1100 may also include a floppy disc drive 1114 and a compact disc (CD) drive 1115 coupled to the processor 1102. In a notebook configuration, the computer housing includes the touchpad 1117, the keyboard 1118, and the display 1119 all coupled to the processor 1102. Other configurations of the computing device may include a computer mouse or trackball coupled to the processor (e.g., via a USB input) as are well known, which may also be used in conjunction with the various embodiments.

Figure 12:
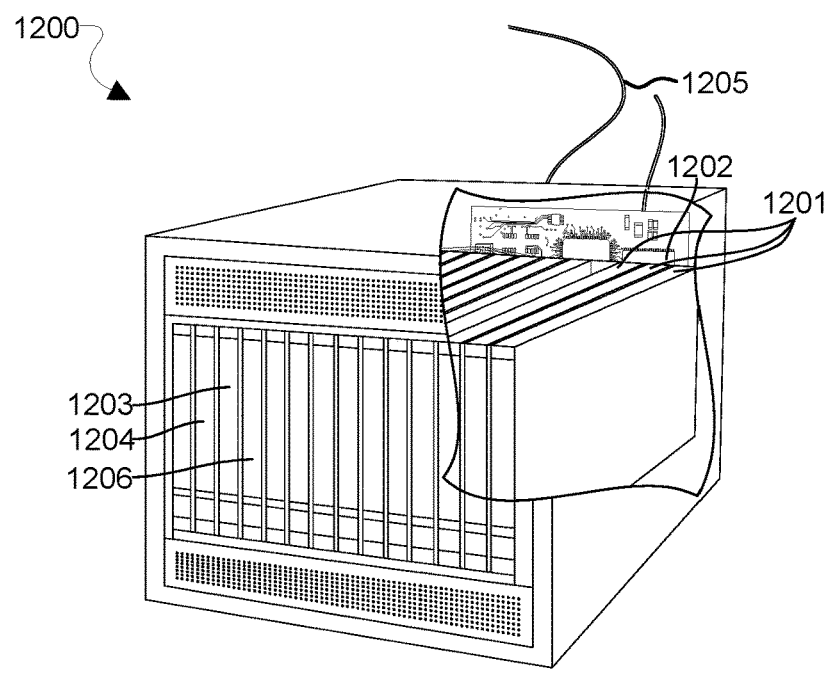
FIG. 12 is a component block diagram illustrating an example server suitable for use with the various embodiments.

The various embodiments (including, but not limited to, embodiments described above with reference to FIGS. 1-7) may also be implemented in fixed computing systems, such as any of a variety of commercially available servers. An example server 1200 is illustrated in FIG. 12. Such a server 1200 typically includes one or more multicore processor assemblies 1201 coupled to volatile memory 1202 and a large capacity nonvolatile memory, such as a disk drive 1204. As illustrated in FIG. 12, multicore processor assemblies 1201 may be added to the server 1200 by inserting them into the racks of the assembly. The server 1200 may also include a floppy disc drive, compact disc (CD) or digital versatile disc (DVD) disc drive 1206 coupled to the processor 1201. The server 1200 may also include network access ports 1203 coupled to the multicore processor assemblies 1201 for establishing network interface connections with a network 1205, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Implementation examples are described in the following paragraphs. While some of the following implementation examples are described in terms of example methods, further example implementations may include: the example methods discussed in the following paragraphs implemented by a computing device comprising a power management controller configured to perform operations or configured with processor-executable instructions to perform operations of the methods of the following implementation examples; the example methods discussed in the following paragraphs implemented by a computing device comprising means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1. A method of system on chip infrastructure secure memory access and power management, including: determining whether a processor is performing a secure memory access transaction; and gating a clock signal from being transmitted to a secure portion of a memory in response to determining that the processor is not performing a secure memory access transaction.

Example 2. The method of example 1, in which gating the clock signal from being transmitted to the secure portion of the memory includes continuing to gate a gated clock signal from being transmitted to the secure portion of the memory.

Example 3. The method of either of examples 1 or 2, further including receiving a memory access transaction security type configured to indicate whether a memory access transaction is secure.

Example 4. The method of any of examples 1-3, in which gating the clock signal from being transmitted to the secure portion of the memory includes gating the clock signal from being transmitted to configuration and status registers in the secure portion of register blocks or arrays.

Example 5. The method of any of examples 1-3, in which gating the clock signal from being transmitted to the secure portion of the memory includes gating the clock signal from being transmitted to static random access memory blocks in the secure portion of a static random access memory.

Example 6. The method of any of examples 1-5, further including: determining whether any processor is operating in a secure mode; and waking up the secure portion of the memory in response to determining that a processor is operating in a secure mode.

Example 7. The method of example 6, further including receiving a processor security state signal, in which the processor security state signal is configured to indicate whether any processor is operating in a secure mode.

Example 8. The method of either of examples 6 or 7, in which waking up the secure portion of the memory may include waking up static random access memory blocks in the secure portion of a static random access memory.

Example 9. The method of any of examples 1-8, further including: determining whether any processor is operating in a secure mode; and transmitting a retention signal to the secure portion of the memory in response to determining that no processor is operating in a secure mode, in which the retention signal is configured to set a retention state for the secure portion of the memory.

Example 10. The method of example 9, further including receiving a processor security state signal, in which the processor security state signal is configured to indicate whether no processors are operating in a secure mode.

Example 11. The method of either of examples 9 or 10, in which transmitting the retention signal to the secure portion of the memory include transmitting the retention signal to static random access memory blocks in the secure portion of a static random access memory.

Example 12. A method of system-on-chip infrastructure secure memory access and power management, including: determining whether any processor is operating in a secure mode; and transmitting a retention signal to the secure portion of the memory in response to determining that no processor is operating in a secure mode, in which the retention signal is configured to set a retention state for the secure portion of the memory.

Example 13. The method of example 12, further including receiving a processor security state signal, in which the processor security state signal is configured to indicate whether no processors are operating in a secure mode.

Example 14. The method of either of examples 11 or 12, in which transmitting the retention signal to the secure portion of the memory includes transmitting the retention signal to static random access memory blocks in the secure portion of a static random access memory.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of system on chip infrastructure secure memory access and power management, comprising:
determining whether a processor is performing a secure memory access transaction; and
gating a clock signal from being transmitted to a secure portion of a memory in response to determining that the processor is not performing a secure memory access transaction.

2. The method of claim 1, wherein gating the clock signal from being transmitted to the secure portion of the memory comprises continuing to gate a gated clock signal from being transmitted to the secure portion of the memory.

3. The method of claim 1, further comprising receiving a memory access transaction security type configured to indicate whether a memory access transaction is secure.

4. The method of claim 1, wherein gating the clock signal from being transmitted to the secure portion of the memory comprises gating the clock signal from being transmitted to configuration and status registers in the secure portion of register blocks or arrays.

5. The method of claim 1, wherein gating the clock signal from being transmitted to the secure portion of the memory comprises gating the clock signal from being transmitted to static random access memory blocks in the secure portion of a static random access memory.

6. The method of claim 1, further comprising:
determining whether any processor is operating in a secure mode; and
waking up the secure portion of the memory in response to determining that a processor is operating in a secure mode.

7. The method of claim 6, further comprising receiving a processor security state signal, wherein the processor security state signal is configured to indicate whether any processor is operating in a secure mode.

8. The method of claim 6, wherein waking up the secure portion of the memory comprises waking up static random access memory blocks in the secure portion of a static random access memory.

9. A computing device, comprising:
a power management controller configured to perform operations comprising:
determining whether a processor is performing a secure memory access transaction; and
gating a clock signal from being transmitted to a secure portion of a memory in response to determining that the processor is not performing a secure memory access transaction.

10. The computing device of claim 9, wherein the power management controller is configured to perform operations such that gating the clock signal from being transmitted to the secure portion of the memory comprises continuing to gate a gated clock signal from being transmitted to the secure portion of the memory.

11. The computing device of claim 9, wherein the power management controller is configured to perform operations further comprising receiving a memory access transaction security type configured to indicate whether a memory access transaction is secure.

12. The computing device of claim 9, wherein the power management controller is configured to perform operations such that gating the clock signal from being transmitted to the secure portion of the memory comprises gating the clock signal from being transmitted to configuration and status registers in the secure portion of register blocks or arrays.

13. The computing device of claim 9, wherein the power management controller is configured to perform operations such that gating the clock signal from being transmitted to the secure portion of the memory comprises gating the clock signal from being transmitted to static random access memory blocks in the secure portion of a static random access memory.

14. The computing device of claim 9, wherein the power management controller is configured to perform operations further comprising:
determining whether any processor is operating in a secure mode; and
waking up the secure portion of the memory in response to determining that a processor is operating in a secure mode.

15. The computing device of claim 9, wherein the power management controller is configured with controller-executable instructions to perform the operations.

16. The computing device of claim 14, wherein the power management controller is configured to perform operations further comprising receiving a processor security state signal, wherein the processor security state signal is configured to indicate whether any processor is operating in a secure mode.

17. The computing device of claim 14, wherein the power management controller is configured to perform operations such that waking up the secure portion of the memory comprises waking up static random access memory blocks in the secure portion of a static random access memory.

18. A method of system on chip infrastructure secure memory access and power management, comprising:
determining whether any processor is operating in a secure mode; and
transmitting a retention signal to the secure portion of the memory in response to determining that no processor is operating in a secure mode, wherein the retention signal is configured to set a retention state for the secure portion of the memory.

19. The method of claim 18, further comprising receiving a processor security state signal, wherein the processor security state signal is configured to indicate whether no processors are operating in a secure mode.

20. The method of claim 18, wherein transmitting the retention signal to the secure portion of the memory comprises transmitting the retention signal to static random access memory blocks in the secure portion of a static random access memory.

21. A computing device, comprising:
a power management controller configured to perform operations comprising:
determining whether any processor is operating in a secure mode; and
transmitting a retention signal to a secure portion of a memory in response to determining that no processor is operating in a secure mode, wherein the retention signal is configured to set a retention state for the secure portion of the memory.

22. The computing device of claim 21, wherein the power management controller is configured to perform operations further comprising receiving a processor security state signal, wherein the processor security state signal is configured to indicate whether no processors are operating in a secure mode.

23. The computing device of claim 21, wherein the power management controller is configured to perform operations such that transmitting the retention signal to the secure portion of the memory comprises transmitting the retention signal to static random access memory blocks in the secure portion of a static random access memory.

24. The computing device of claim 21, wherein the power management controller is configured with controller-executable instructions to perform the operations.

* * * * *